(12) United States Patent
Yamanaka et al.

(10) Patent No.: US 9,236,692 B2
(45) Date of Patent: Jan. 12, 2016

(54) CARD CONNECTOR

(71) Applicant: Molex, LLC, Lisle, IL (US)

(72) Inventors: Manabu Yamanaka, Yamato (JP);
Masamitsu Takasaki, Yamato (JP);
Takashi Fujikawa, Yamato (JP);
Mitsuhiro Tomita, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/043,989

(22) Filed: Oct. 2, 2013

(65) Prior Publication Data

US 2014/0094050 A1 Apr. 3, 2014

(30) Foreign Application Priority Data

Oct. 2, 2012 (JP) .................................. 2012-220198

(51) Int. Cl.
*H01R 12/50* (2011.01)
*G06K 13/08* (2006.01)

(52) U.S. Cl.
CPC ........ *H01R 23/7068* (2013.01); *G06K 13/0831* (2013.01)

(58) Field of Classification Search
USPC .................................. 439/327, 159, 630, 633
See application file for complete search history.

(56) References Cited

U.S. PATENT DOCUMENTS

| | | | |
|---|---|---|---|
| 7,094,082 B2 * | 8/2006 | Ooya et al. ..................... | 439/159 |
| 8,308,495 B2 * | 11/2012 | Yu et al. ......................... | 439/159 |
| 8,864,525 B2 * | 10/2014 | Nakamura ..................... | 439/633 |
| 2004/0029446 A1 * | 2/2004 | Ooya et al. ..................... | 439/630 |
| 2008/0050937 A1 * | 2/2008 | Miyao et al. ................... | 439/64 |
| 2009/0023318 A1 * | 1/2009 | Nishioka et al. ............... | 439/159 |
| 2012/0329330 A1 * | 12/2012 | Uesaka et al. .................. | 439/630 |
| 2014/0057469 A1 * | 2/2014 | Tsuji et al. ..................... | 439/159 |
| 2014/0094050 A1 * | 4/2014 | Yamanaka et al. ............. | 439/327 |

FOREIGN PATENT DOCUMENTS

| | | |
|---|---|---|
| CN | 2484597 Y | 4/2002 |
| CN | 1808785 A | 7/2006 |
| JP | 08-161439 A | 6/1996 |
| JP | 2007-317450 | 12/2007 |

* cited by examiner

*Primary Examiner* — Alexander Gilman

(57) ABSTRACT

Comprised are a sliding member for retaining a card and sliding in the forward/backward direction of a housing, and a locking member for sliding in the widthwise direction of the housing and locking the card received within the housing, the locking member comprising a sliding control part for controlling the sliding of the sliding member, the sliding control part preventing the sliding member from sliding when the locking member is in a first position, and allowing the sliding member to slide when the locking member is in a second position.

15 Claims, 22 Drawing Sheets

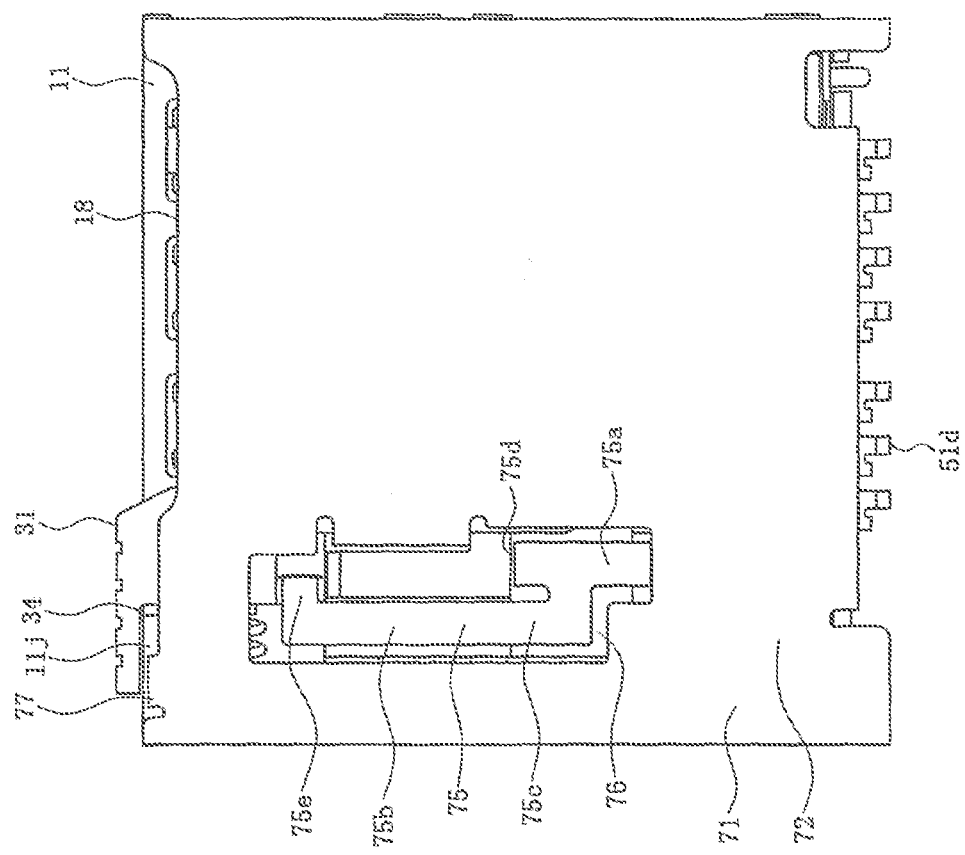
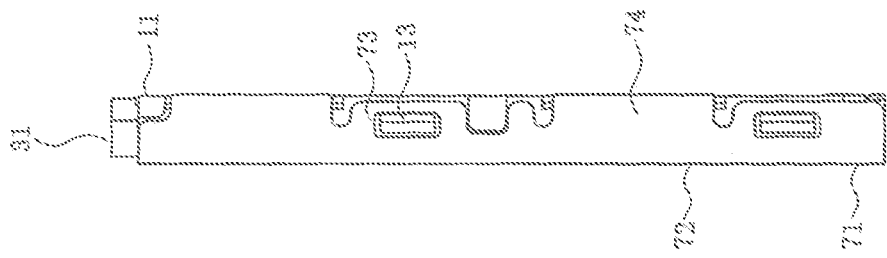
FIG. 2A
FIG. 2B

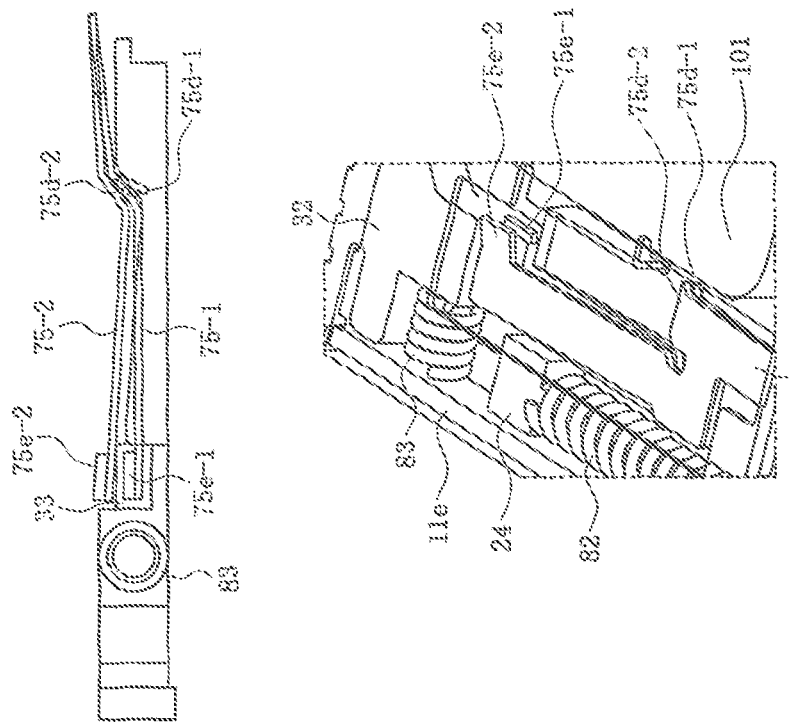
FIG. 8B
FIG. 8C
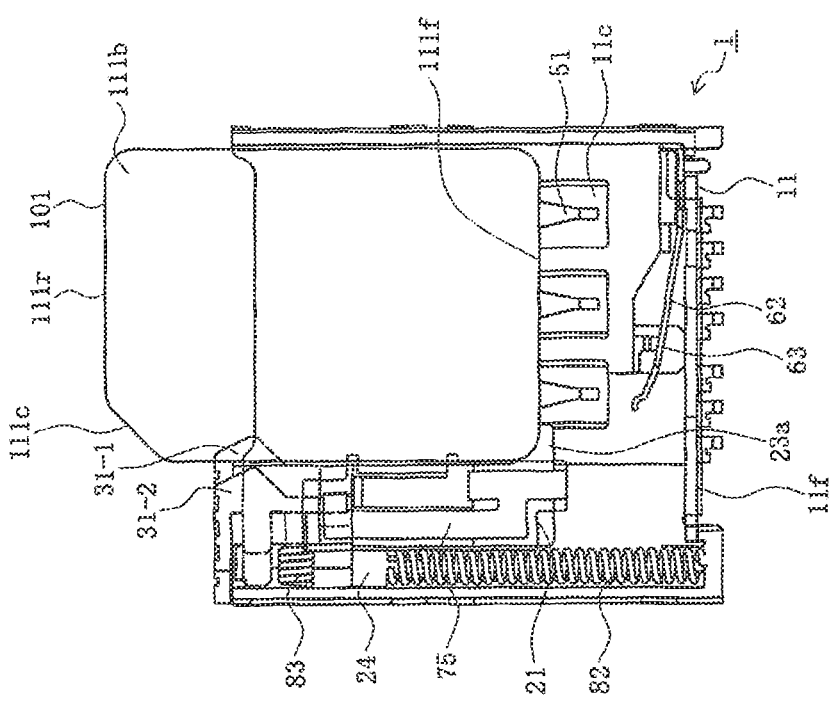
FIG. 8A

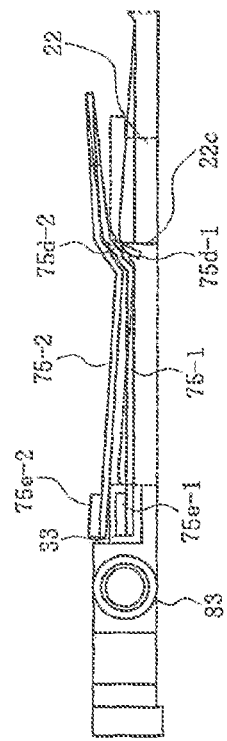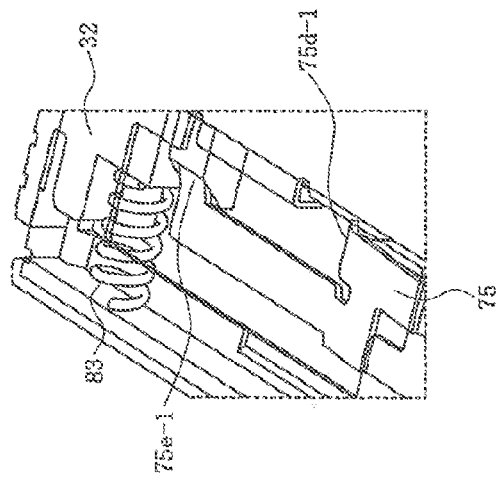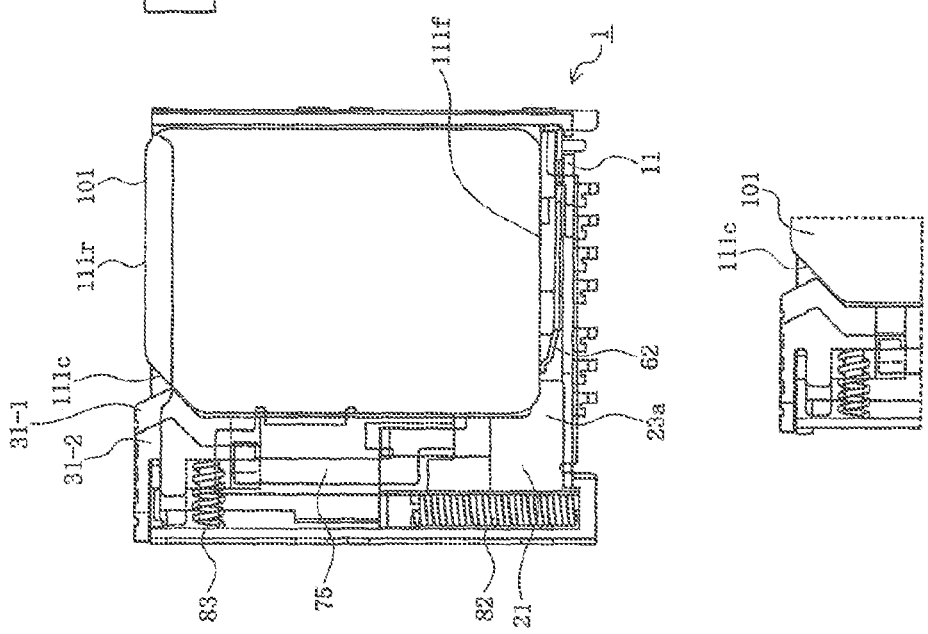

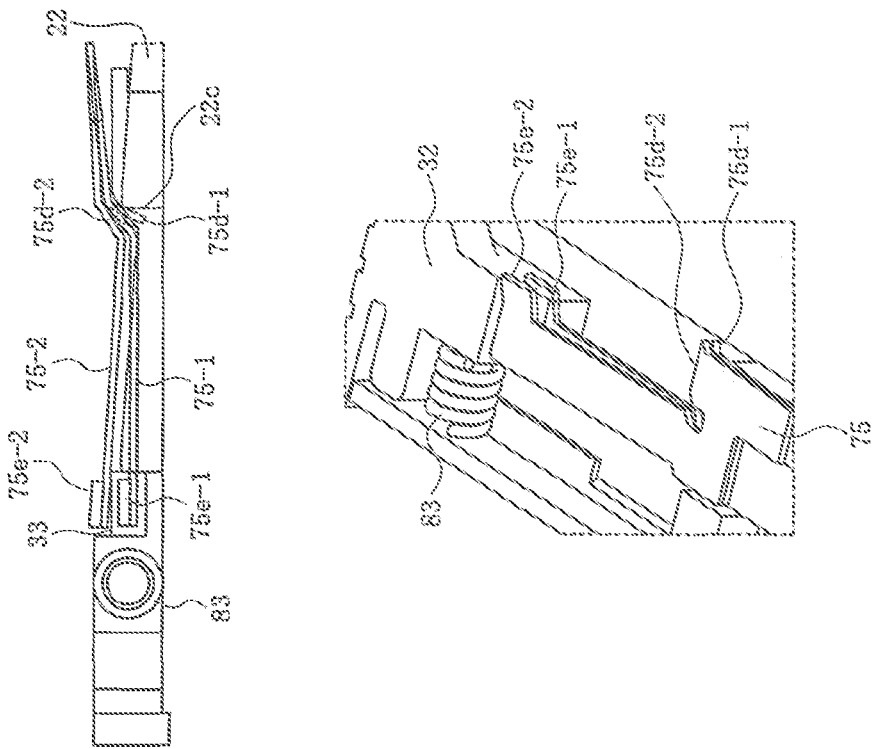
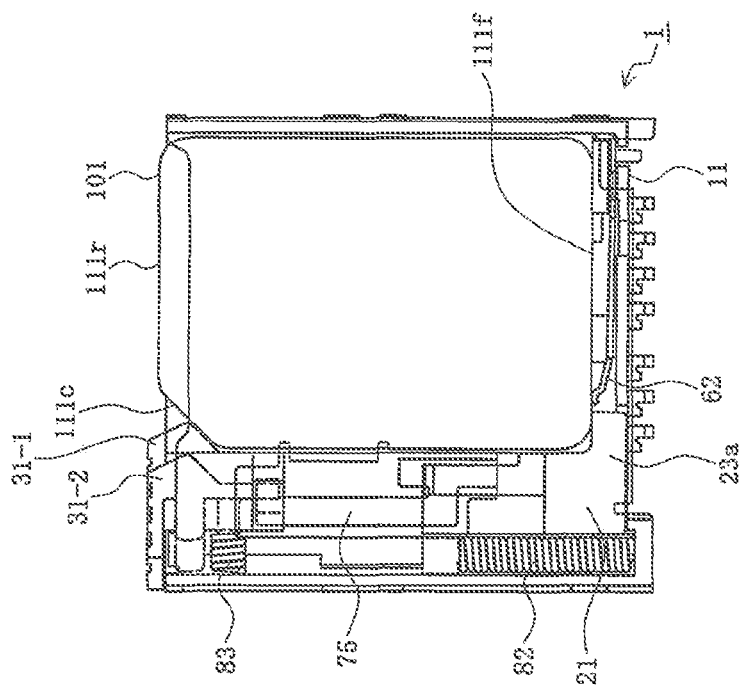

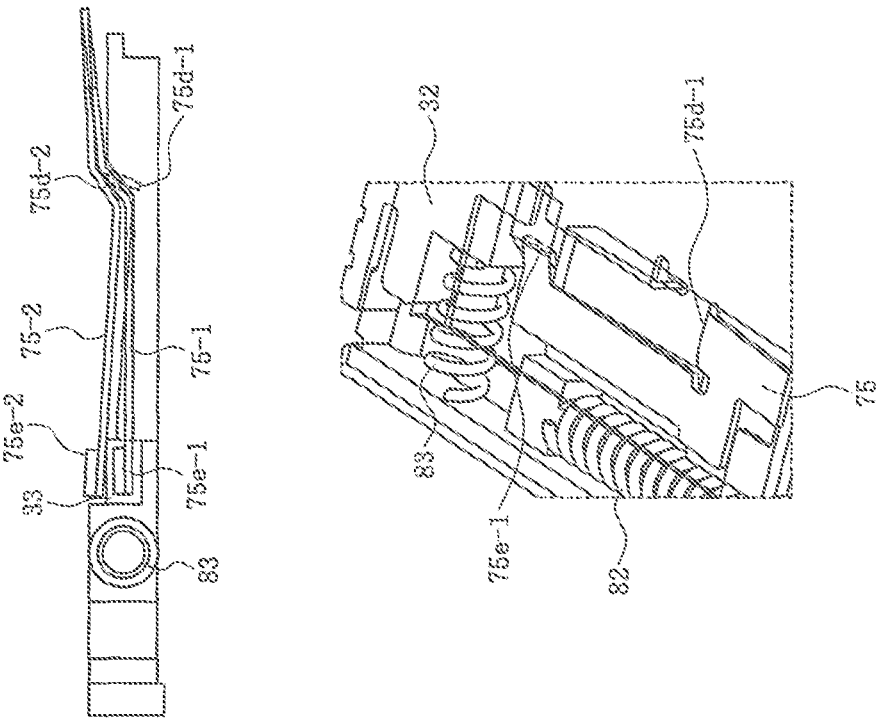
FIG. 11B
FIG. 11C
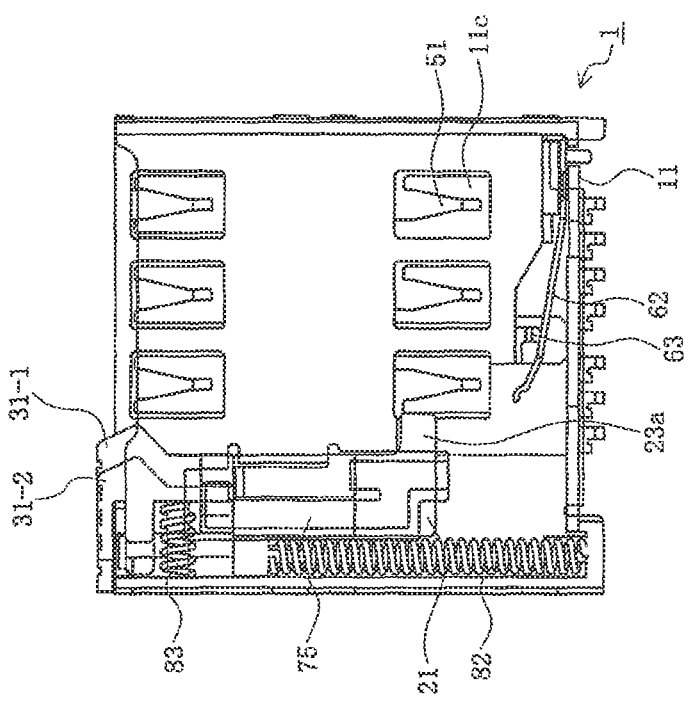
FIG. 11A

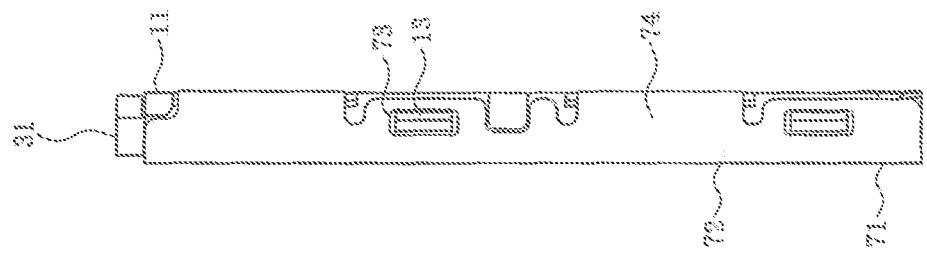
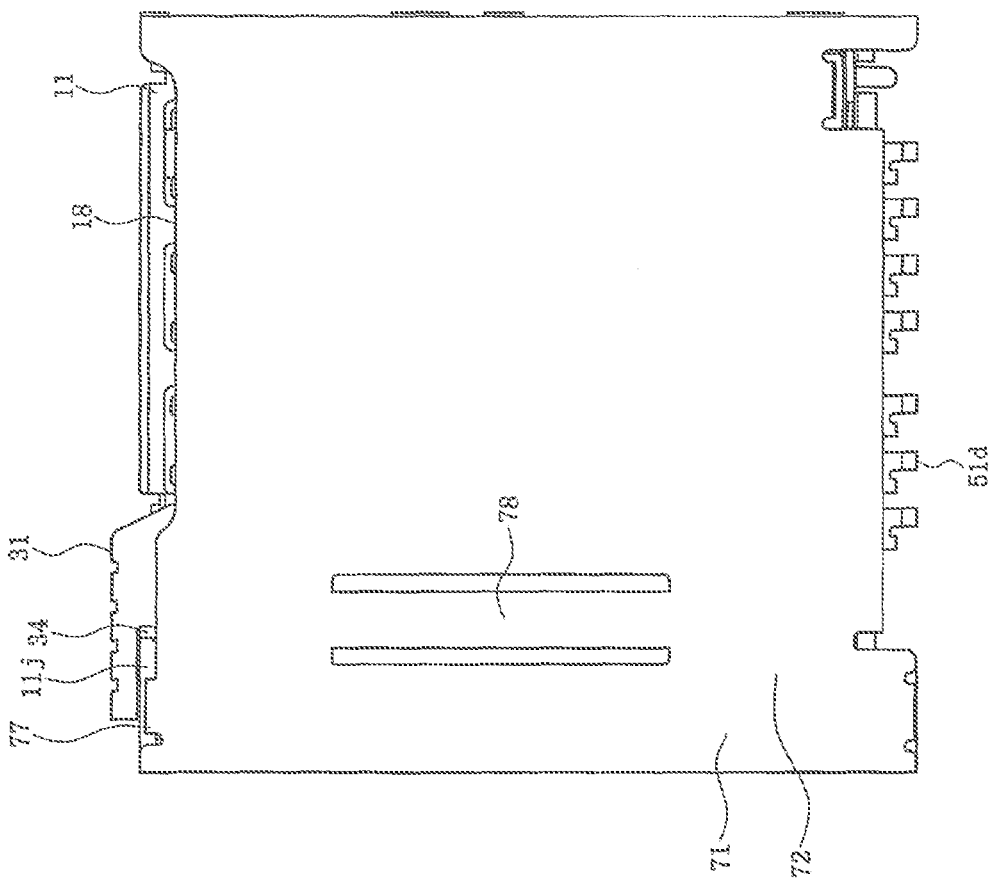

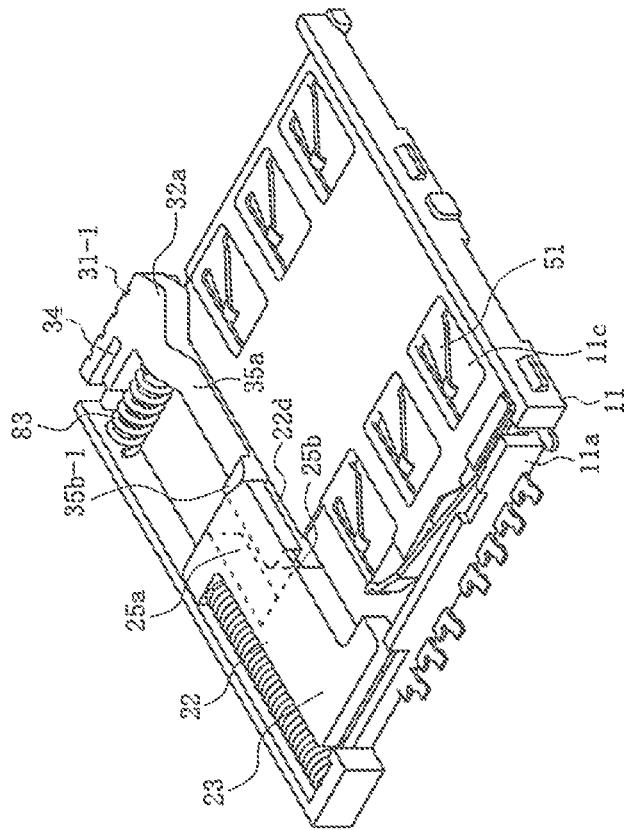
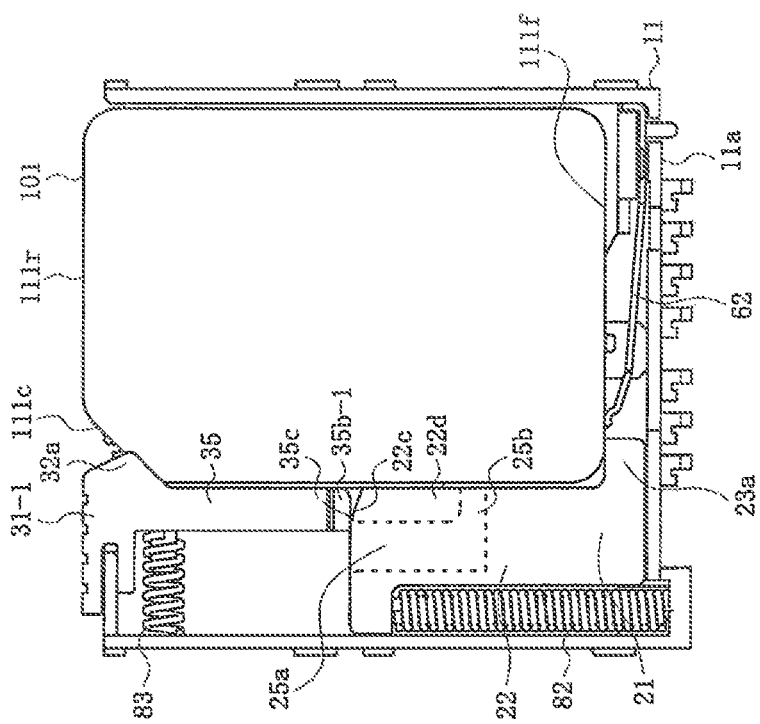
FIG. 19B
FIG. 19A

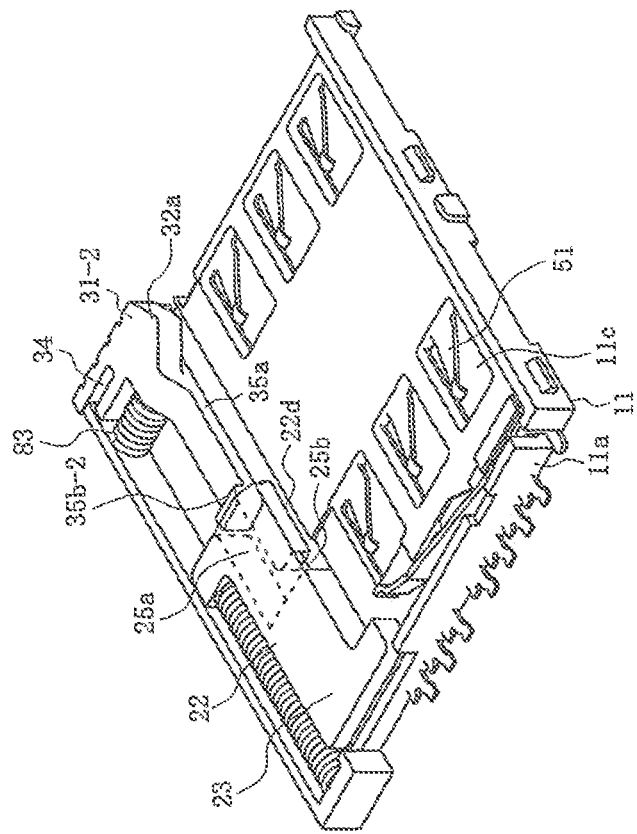
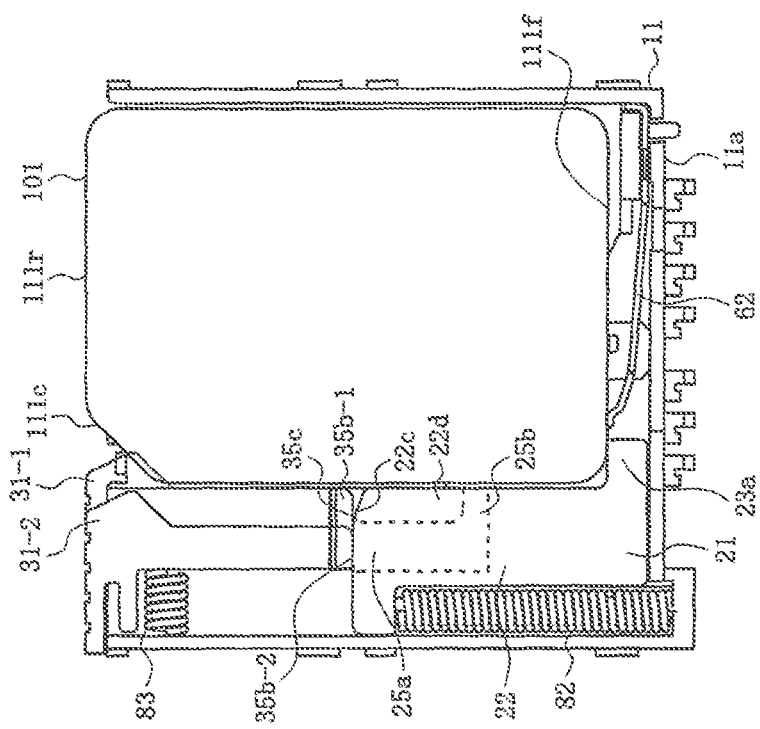
FIG. 20A
FIG. 20B

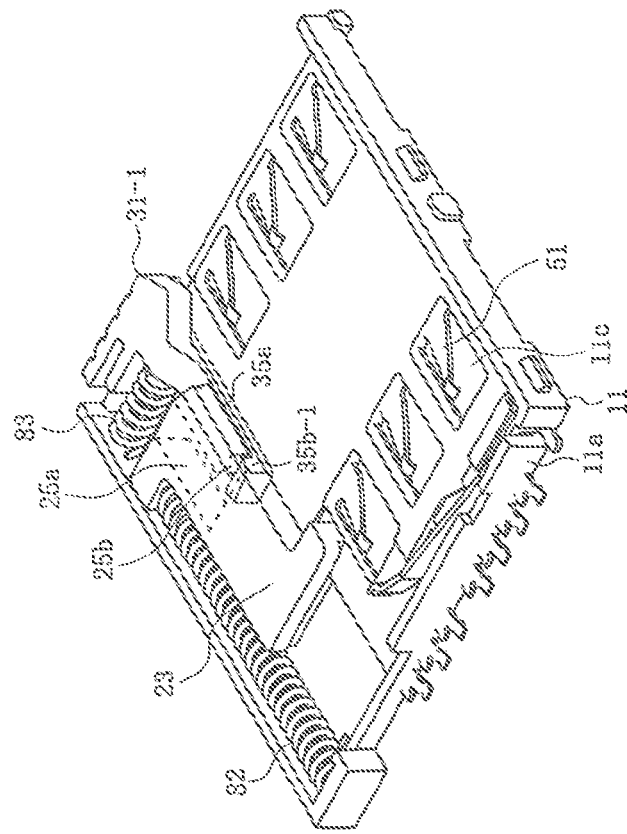
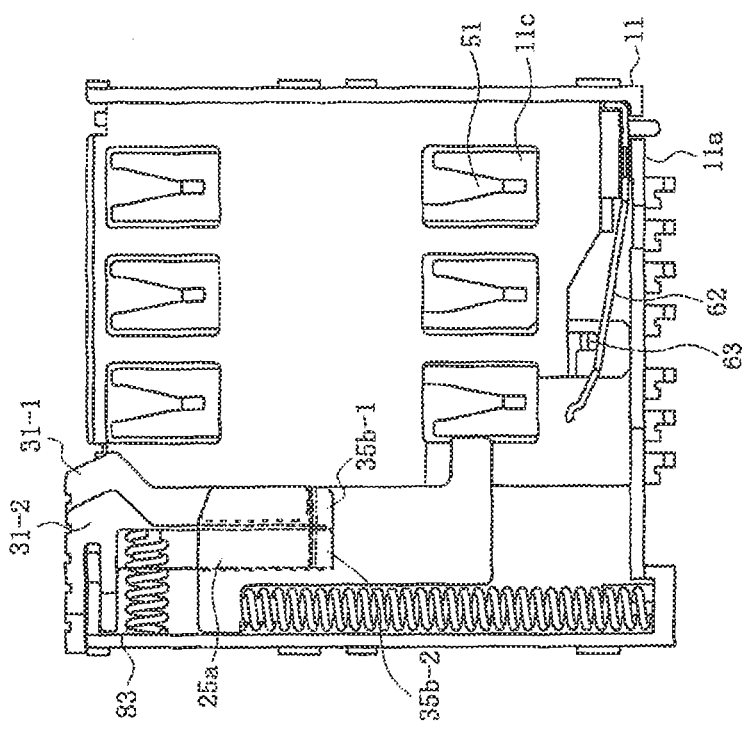
FIG. 21A
FIG. 21B

CARD CONNECTOR

REFERENCE TO RELATED APPLICATIONS

The Present Disclosure claims priority to prior-filed Japanese Patent Application No. 2012-220198, entitled "Card Connector," filed on 2 Oct. 2012 with the Japanese Patent Office The content of the aforementioned Patent Application is incorporated in its entirety herein.

BACKGROUND OF THE PRESENT DISCLOSURE

The Present Disclosure relates, generally, to a card connector, and, more particularly, to a card connector in which a sliding member slides smoothly in the forward/backward direction, a card can be guided in the forward/backward direction with consistent reliability, a lock member is capable of smoothly performing locking/unlocking operations, and the card can be easily and reliably inserted/ejected.

Conventionally, electronic devices (e.g., personal computers, portable telephones, personal digital assistants, digital cameras, video cameras, music players, game devices, vehicle navigation devices, etc.) have been provided with card connectors in order to use various types of memory cards. One example of a conventional card connector is disclosed in Japanese Patent Application No. 2006-144638, the content of which is hereby incorporated by reference herein.

FIG. 22 is an illustration of a conventional card connector. In FIG. 22, 811 is a base member for a card connector, and 871 is a cover member for covering the base member 811. An IC card (not shown) is received in the space between the base member 811 and the cover member 871. The IC card has an electrode pad (not shown) exposed on its underside. Terminals 851 are retained in the base member 811. Contact parts 851c of the terminals 851 are provided at positions corresponding to holes formed in the cover member 871, and tails 851d of the terminals 851 extend from the interior of the base member 811 (the upper side in FIG. 22). In the example shown, contact parts 851c for a total of six terminals 851 are arranged in two rows to match the arrangement of the electrode pads of the IC card.

Ejection member 823 is slidable in the forward/backward direction, and biases the IC card in the insertional direction, i.e., the front side, using a coil spring 882. FIG. 22 illustrates a state prior to the IC card being inserted into the space between the base member 811 and the cover member 871, and shows the ejection member 823 projecting to the utmost extend to the front of the card connector (downwards in FIG. 22). The ejection member 823 is also provided with a card-receiving part 823a engaging with the front end of an inserted IC card, a locking hook 823b and a guide pin 823c engaged to be capable of moving within a guide hole 822 formed in the cover member 871. The ejection member 823 is capable of rotating around the guide pin 823c. The outer surface of the ejection member 823 (i.e., the left surface in the drawing) is biased inward (to the right in FIG. 22) by the free end of a return spring 875 formed on a side wall of the cover member 871. The inner surface (i.e., the right surface of FIG. 22) of the ejection member 823 is thereby pressed against a projection 876 formed in the cover member 871.

When an IC card is inserted into the space between the base member 811 and the cover member 871 from the front side of the card connector, the card-receiving part 823a engages with the front end of the IC card, and the ejection member 823 proceeds into the interior of the card connector along with the IC card against the biasing force of the coil spring 882. When the IC card reaches the interior and insertion is complete, the projection 876 advances into a recess adjacent to the locking hook 823b of the ejection member 823, engaging with a locking surface 823d. The ejection member 823 is then rotated around the guide pin 823c in the counterclockwise direction, as shown in FIG. 22, by the biasing force of the return spring 875, and the locking hook 823b engages with the rear end of the IC card.

The ejection member 823 is thereby locked in place by the projection 876, preventing the card connector from projecting forward. The front and rear ends of the IC card engage with the card-receiving part 823a and locking hook 823b of the ejection member 823, preventing the card connector from projecting forward, like the ejection member 823. In other word, the IC card is prevented from popping out unnecessarily. During the process of removing the IC card from the card connector, when the locking hook 823b is moved to the left as shown, the engagement of the locking hook 823b with the rear end of the IC card is released, and the locking of the ejection member 823 by the projection 876 is released, resulting in the IC card being pushed out and ejected from the card connector along with the ejection member 823 by the biasing force of the coil spring 882.

SUMMARY OF THE PRESENT DISCLOSURE

However, in the conventional card connector described above, the rotation of the ejection member 823 around the guide pin 823c moves the card-receiving part 823a and locking hook 823b formed on the front and rear ends of the ejection member 823 in the widthwise direction, engaging and releasing the IC card. It is thus impossible to strictly define the relative positions of the ejection member 823 and the IC card with respect to the widthwise direction, and the guide hole 822 for guiding the guide pin 823c is broadly formed, allowing the ejection member 823 as a whole to be displaced to a considerable degree in the widthwise direction. In other words, the ejection member 823 exhibits a large degree of play in the widthwise direction.

This results in the engagement and release of the IC card by the ejection member 823 becoming unstable, making it impossible to consistently insert and eject the IC card with reliability. In addition, the ejection member 823 rotates around the guide pin 823c when sliding forward and backward between the base member 811 and the cover member 871, leading to the risk of the ejection member being incapable of sliding smoothly, and further undermining the reliability of the operations of inserting and ejecting the IC card.

Thus, an object of the Present Disclosure is to resolve the problems inherent in conventional card connectors, and provide a highly reliable card connector in which a sliding member slides smoothly in the forward/backward direction, a card can be guided in the forward/backward direction with consistent reliability, a lock member is capable of smoothly performing locking/unlocking operations, and the card can be easily and reliably inserted/ejected.

To this end, the card connector according to the Present Disclosure is provided with a housing for receiving a card provided with a terminal member and a connector terminal, attached to the housing, for contacting the terminal member of the card, the card connector further comprising: a sliding member for retaining a card inserted from a rear end of the housing towards a front end and sliding in the forward/backward direction of the housing; a first biasing member for biasing the sliding member towards the rear end; a locking member, provided on the rear end of the housing, for sliding in the widthwise direction of the housing and locking the card received in the housing; and a second biasing member for biasing the locking member towards the center of the widthwise direction of the housing; the locking member comprising a sliding control part for controlling the sliding of the sliding member; the sliding control part preventing the sliding member from sliding when the locking member is in a first position for blocking the sliding of the card in the forward/backward direction of the housing, and allowing the sliding member to slide when the locking member is in a second position for allowing the card to slide in the forward/backward direction of the housing.

In another card connector according to the Present Disclosure, the locking member further comprises a card engagement part, the card engagement part engaging with a cutout part formed in one end of the rear end of the card received in the housing when the locking member is in the first position.

Another card connector according to the Present Disclosure is further provided with a cover member attached to the housing and comprising an upper plate for at least partially covering the housing and the card inserted in the housing; the housing comprising a guide ridge extending along the rear end; the cover member comprising a guide tab formed at a position facing the guide ridge of the upper plate; the locking member comprising a groove-shaped guide recession extending in the widthwise direction of the housing; and the guide recession slidably engaging with the guide ridge and the guide tab.

In another card connector according to the Present Disclosure, the upper plate further comprises an intermediate sliding control member for allowing the sliding member to slide or preventing the sliding member from sliding according to the position of the sliding control part, and the intermediate sliding control member comprises a lock release abutting part abutting the sliding control part and a sliding lock part capable of engaging with a locked part of the sliding member.

In another card connector according to the Present Disclosure, the sliding control part further comprises a sloped part extending diagonally upwards toward the center of the widthwise direction of the housing, and, when the locking member slides from the first position to the second position, the lock release abutting part moves upward along the sloped part, and the engagement of the sliding lock part with the locked part is released.

In another card connector according to the Present Disclosure, the sliding member further comprises a sliding control recession capable of engaging with the sliding control part, and the sliding control part comprises an engagement ridge capable of engaging with an engagement recession constituted by the sliding control recession and a sliding lock part capable of engaging with the locked part of the sliding member.

In another card connector according to the Present Disclosure, the sliding control recession comprises a main recession extending in the forward/backward direction of the housing, the engagement recession extends from a front end of the main recession towards the center of the widthwise direction of the housing, the sliding control part comprises an arm extending forward, the engagement ridge projects from a front end of the arm, the sliding lock part is a front end surface of the engagement ridge, and the locked part is a rear end surface of the sliding member.

In accordance with the Present Disclosure, the sliding member of the card connector smoothly slides in the forward/backward direction, allowing for consistently accurate guidance of the card in the forward/backward direction. In addition, the locking member is capable of smoothly performing locking and unlocking operations, allowing the card to be reliably and easily inserted and ejected, and affording high reliability.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 2 is a two-surface view of the card connector of FIG. 1, in which (a) is an upper surface view and (b) is a side surface view;

FIG. 8 is an illustration of the first embodiment of the Present Disclosure with a card in the process of being inserted, in which (a) is a perspective view from above, (b) is a side view of essential parts showing the operation of a locking spring member, and (c) is a perspective view from above of essential parts showing the operation of the locking spring member;

FIG. 9 is an illustration of the first embodiment of the Present Disclosure in which a card has completely inserted, in which (a) is a perspective view from above, (b) is a side view of essential parts showing the operation of the locking spring member, (c) is a perspective view from above of essential parts showing the operation of the locking spring member, and (d) is an upper surface view of essential parts showing the operation of the locking member;

FIG. 10 is an illustration of the first embodiment of the Present Disclosure in which the process of ejecting a card has begun, in which (a) is a perspective view from above, (b) is a side view of essential parts showing the operation of the locking spring member, and (c) is a perspective view from above of essential parts showing the operation of the locking spring member;

FIG. 11 is an illustration of the first embodiment of the Present Disclosure in which the process of ejecting a card is complete, in which (a) is a perspective view from above, (b) is a side view of essential parts showing the operation of the locking spring member, and (c) is a perspective view from above of essential parts showing the operation of the locking spring member;

FIG. 13 is a two-surface view of the card connector of FIG. 12, in which (a) is an upper surface view and (b) is a side surface view;

FIG. 19 is an illustration of the second embodiment of the Present Disclosure in which a card has been completely inserted, in which (a) and (b) are, respectively, an upper surface view and a perspective view with a shell thereof removed;

FIG. 20 is an illustration of the second embodiment of the Present Disclosure in which the process of ejecting a card has begun, in which (a) and (b) are, respectively, an upper surface view and a perspective view with a shell thereof removed;

FIG. 21 is an illustration of the second embodiment of the Present Disclosure in which the process of ejecting a card is complete, in which (a) and (b) are, respectively, an upper surface view and a perspective view with a shell thereof removed.

DESCRIPTION OF THE PREFERRED EMBODIMENTS

Figure 1B:
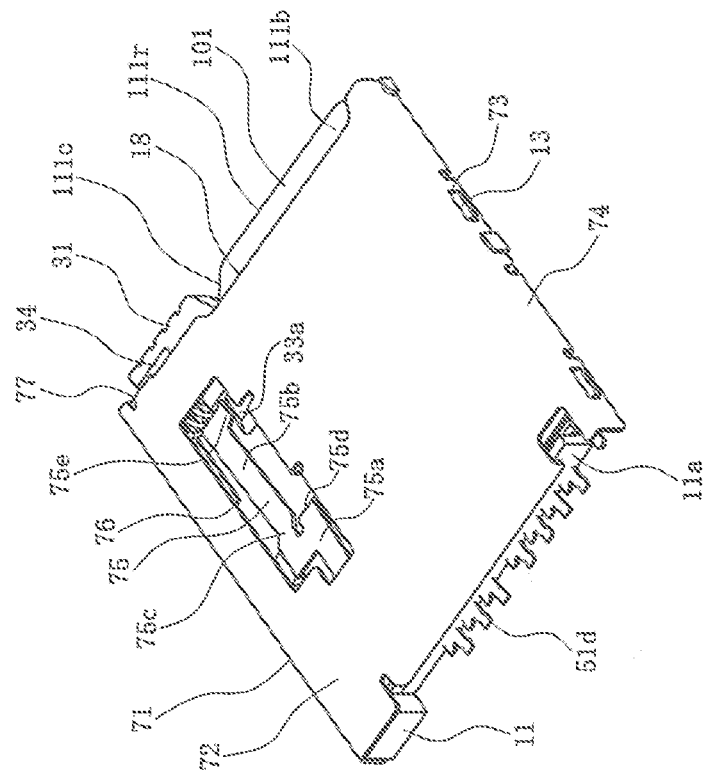
FIG. 1 is a perspective view of a card connector according to a first embodiment of the Present Disclosure, showing a state in which a card is (a) not inserted, and (b) inserted.

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Referring to FIGS. 1-7, 1 is a card connector according to an embodiment of the Present Disclosure, the connector being connected to an electronic device not shown in the drawing. A card 101 is inserted into the card connector 1, and is installed in the electronic device via the card connector 1. In this embodiment, the card 101 has a roughly rectangular overall shape, and a plurality of contact pads (not shown) serving as electrode pads constituting terminal members is provided aligned along a front end 11*f* on the underside (i.e., the surface on the opposite side as the upper surface 111*b*; described hereafter) at a part towards the front end. A plurality of contact pads is also provided aligned along a rear end 111*r* on the lower surface of a part towards the rear end 111*r*. That is, the contact pads are arranged so as to form two rows extending in the widthwise direction of the card 101. No contact pads are provided on the upper surface 111*b*. A diagonal cutout part 111*c* is formed in a corner connecting the right and left ends and a side edge of the rear end 111*r*—specifically, in the rear left corner of the upper surface 111*b*.

Here, the card connector 1 comprises a housing 11 integrally formed from a synthetic resin or other insulating material, and a shell 71 acting as a cover member, the shell 71 being integrally formed by punching, bending, or otherwise machining a sheet of metal or other electroconductive material and being attached to an upper side of the housing 11. The shell 71 at least partially covers the upper part of the housing 11 and the card 101 inserted into the housing 11. The card connector 1 has a flattened roughly cuboidal shape and is attached to the electronic device, and the card 101 is inserted into the housing 11 through an insertion slot 18 in the rear side thereof (i.e., the upper right side in FIG. 1). Specifically, the card 101 is inserted into a space formed between the housing 11 and the shell 71.

As shown, the housing 11 comprises a bottom wall 11*b* constituting a roughly rectangular plate-shaped member, an inner wall 11*a* extending along an edge of the housing 11 that is forward with respect to the direction in which the card 101 is inserted, i.e., along a front edge 11*f*, and rising vertically from the bottom wall 11*b*, and side walls 11*e* extending in the forward/backward direction along right and left side edges of the bottom wall 11*b*. The bottom wall 11*b* is provided with terminal retaining recessions 11*c* for retaining the terminals 51 acting as connector terminals. The terminal retaining recessions 11*c* are openings penetrating the bottom wall 11*b* in the through-thickness direction, and are disposed aligned in rows extending in the widthwise direction of the housing 11 along the front and rear edges of the housing 11 in the insertional direction of the card 101, i.e., the front edge 11*f* and rear edge 11*r* constituting the front and rear edges. In the example shown, three recessions are aligned in two rows. One of the terminals 51 is received and retained within each of the terminal retaining recessions 11*c*.

The terminals 51 are retained by base parts 51*a* thereof being attached to the bottom wall 11*b*. Specifically, the base parts 51*a* are at least partially embedded in the bottom wall 11*b*, and the rest thereof is exposed within the terminal retaining recessions 11*c*. More specifically, the base parts 51*a* are at least partially covered by the insulating material constituting the bottom wall 11*b* via so-called overmolding, thereby embedding and retaining the terminals 51 in the bottom wall 11*b*.

Figure 3:
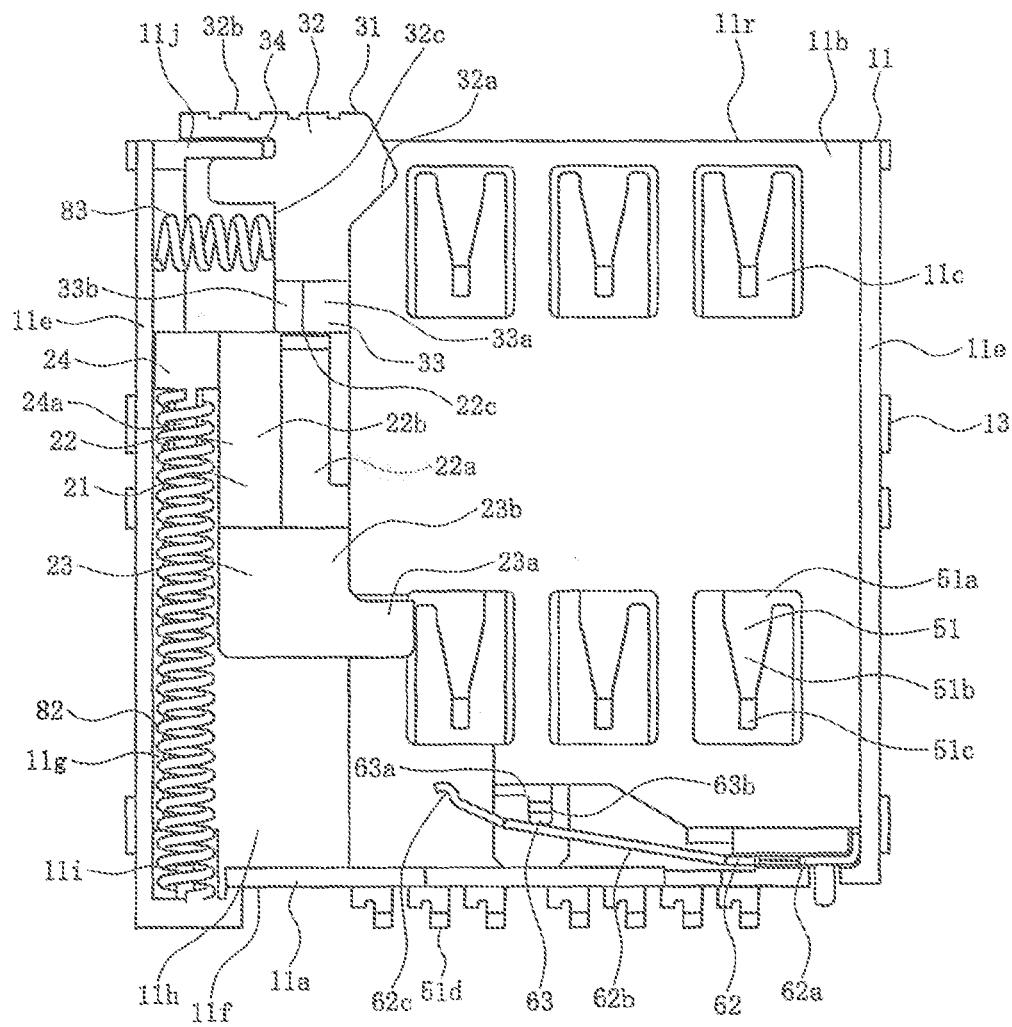
FIG. 3 is a plan view of the card connector of FIG. 1, with a shell thereof removed.

The terminals 51 are provided with cantilevered contact arm parts 51*b* linked at base ends thereof to the base parts 51*a*, and contact parts 51*c* connected to free ends, i.e., the tips, of the contact arm parts 51*b*. The base ends of the contact arm parts 51*b* are positioned toward the rear edge 11*r*, and the tips thereof extend toward the front edge 11*f*, at least the upper surfaces of the contact parts 51*c* being positioned above the upper surface of the bottom wall 11*b* when the card 101 is not inserted in the card insertion space. The contact parts 51*c* have side shapes bent so as to project upward, and the tips thereof face diagonally downwards. As shown in FIG. 3, the contact arm parts 51*b* and the contact parts 51*c* are positioned within the terminal retaining recessions 11*c* as seen from above.

The terminals 51 are disposed so that the contact parts 51c contact the contact pads of the card 101 retained within the card connector 1. Thus, the number and disposition of the terminals 51 are altered, as appropriate, to match the number and disposition of the contact pads of the card 101. In the example shown, the terminals 51 are disposed so as to form three rows in a roughly rectangular lattice as seen from above.

One end of an elongated strip-shaped linking part (not shown) is linked to the base parts 51a of the terminals 51. The linking part extends in the forward/backward direction of the housing 11, and is embedded in the bottom wall 11b. Solder tails 51d extend forward from the other end of the linking part, and are exposed projecting forward from the front edge 11f. The solder tails 51d are electrically connected via soldering to signal lines, compact pads, terminals, and other partner terminal members formed in a circuit board or the like of the electronic device.

A card guidance mechanism-receiving part 11h and a biasing member-receiving part 11g are formed on the inside of one of the side walls 11e of the housing 11 (in FIG. 3, on the left side). A sliding member 21 of a card guidance mechanism for guiding the card 101 inserted into the card connector 1 is attached to the card guidance mechanism-receiving part 11h so as to be slidable in the forward/backward direction. The card guidance mechanism-receiving part 11h is formed so that the upper surface thereof is lower than the upper surface of the bottom wall 11b, and a vertical wall linearly extending in the forward/backward direction forms the boundary with the bottom wall 11b. The sliding member 21 slides in the forward/backward direction along the vertical wall.

In addition, the biasing member-receiving part 11g receives a first biasing member 82 constituted by a coil spring exhibiting a biasing force when in a compressed state. The rear end surface of the part of the inner wall 11a corresponding to the biasing member-receiving part 11g serves as a biasing force-receiving part for receiving the biasing force of the first biasing member 82, a locking projection for locking with the first biasing member 82 is formed on the sliding member 21, and one end of the first biasing member 82 is attached to the sliding member 21.

The sliding member 21 comprises a body part 22, a card-retaining part 23, connected to a front end of the body part 22, for retaining the card 101, and a biasing force-receiving part 24 connected to a side of the rear end of the body part 22. The card-retaining part 23 comprises an elongated strip-shaped front end retaining part 23a extending in the widthwise direction of the housing 11, and a side edge retaining part 23b extending in the forward/backward direction. The biasing force-receiving part 24 receives the biasing force of the first biasing member 82, and projects leftward from the side of the body part 22 as seen in FIG. 3. A locking projection 24a for locking with the first biasing member 82 is also formed, and the other end of the first biasing member 82 is attached thereto.

The body part 22 comprises a sloped part 22a and a flat part 22b extending in the forward/backward direction, and a locked part 22c formed on the rear end of the sloped part 22a and constituted by a vertical wall extending in the vertical direction. The upper surface of the sloped part 22a is a strip-shaped sloped surface extending diagonally upward towards the rear edge 11r so that the front end thereof, i.e., the end connected to the card-retaining part 23, is lowest, and the rear end thereof is highest. The upper surface of the flat part 22b is a strip-shaped flat surface having roughly the same height as the front end of the sloped part 22a and extending towards the rear edge 11r, which has a constant height. The front ends of the upper surfaces of the sloped part 22a and the flat part 22b are lower than the upper surface of the adjacent card-retaining part 23, forming a difference in height at the connection between the sloped part 22a and flat part 22b and the card-retaining part 23.

The sliding member 21 retains the card 101 via the front end retaining part 23a and side edge retaining part 23b of the card-retaining part 23, and moves in the forward/backward direction along with the card 101. The sliding member 21 is biased in the opposite direction as the insertional direction of the card 101; that is, the ejection direction of the card 101, by the first biasing member 82. When the card 101 is moved in the insertional direction via a push operation and reaches the locked position, a locking part 75d of a locking spring member 75 of the shell 71 engages with the locked part 22c of the body part 22 of the sliding member 21 and locks the sliding member 21 in place, thereby retaining the card 101 within the card connector 1 along with the sliding member 21.

A locking member 31 acting as a card-locking member is provided at a position on the card guidance mechanism-receiving part 11h near the rear edge 11r. In this embodiment, the locking member 31 is provided to the rear of the sliding member 21. The locking member 31 comprises a body part 32 acting as a card-locking part, a sliding control part 33 connected to a front end of the body part 32, and an elongated groove-shaped guide recession 34 formed in the body part 32 and extending in the widthwise direction of the housing 11. The guide recession 34 extends along the rear edge 11r at a position near one side wall 11e (the left one in FIG. 3) of the housing 11, and engages with a guide ridge 11j rising vertically from the bottom wall 11b so as to allow for sliding in the widthwise direction. As a result, the locking member 31 smoothly slides in the widthwise direction of the housing 11 along the rear edge 11r of the housing 11. The height (vertical dimensions) of the guide ridge 11j is less than that of the inner wall 11a and the side walls 11e, and is, for example, no more than half that of the inner wall 11a and the side walls 11e. A second biasing member 83 constituted by a coil spring that exerts a biasing force when in a compressed state is housed between the side walls 11e and the locking member 31, biasing the locking member 31 towards the center of the widthwise direction of the housing 11.

Figure 4:
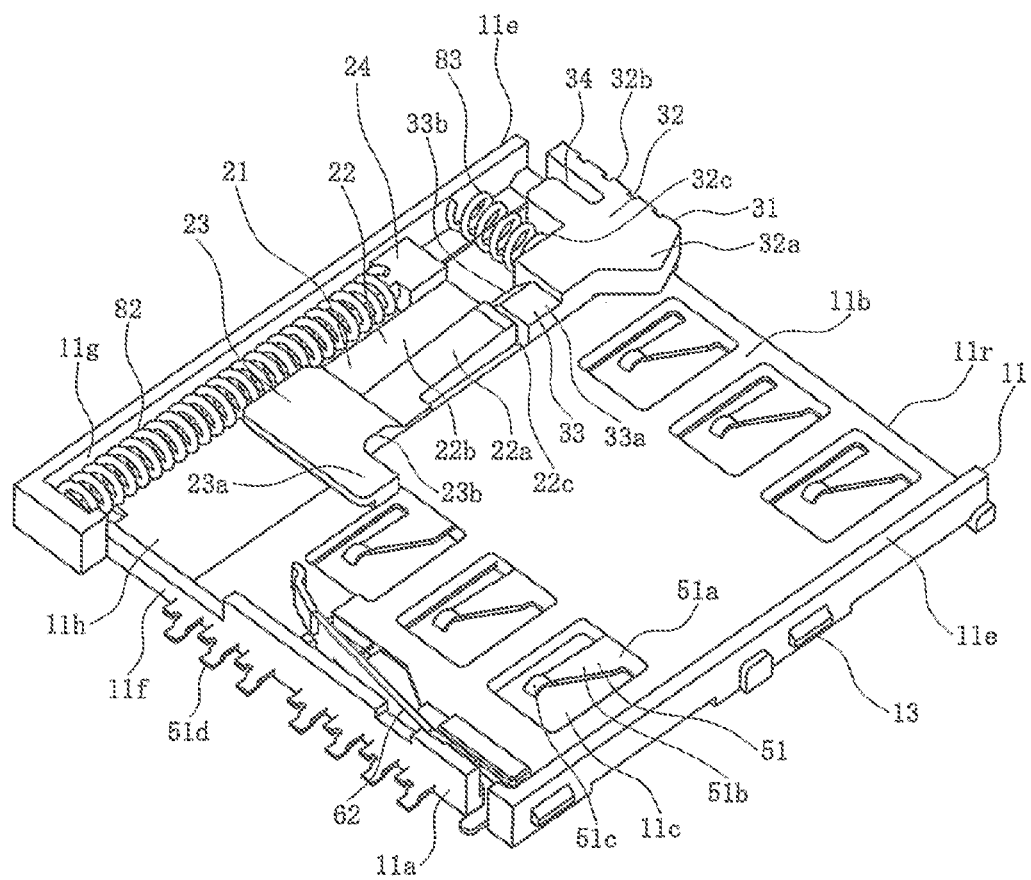
FIG. 4 is a perspective view of the card connector of FIG. 1, with the shell removed.
Figure 5A:
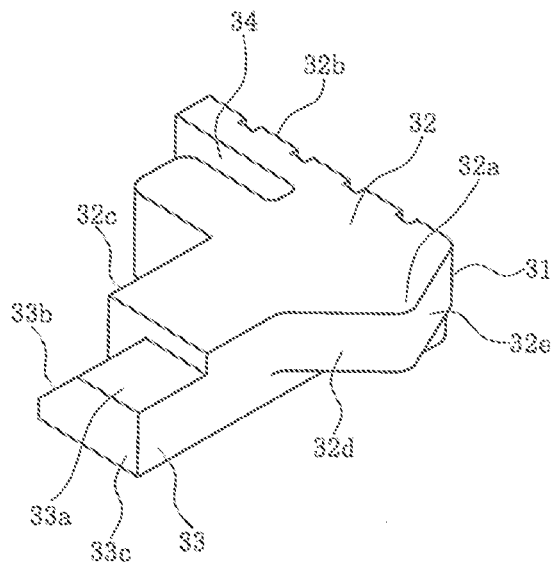
FIG. 5 is a perspective view of a locking member of the card connector of FIG. 1, in which (a) is a view from above, and (b) and (c) are views from below.
Figure 5B:
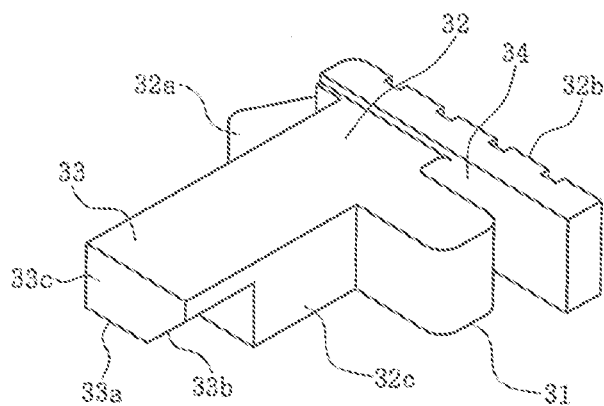
Figure 5C:
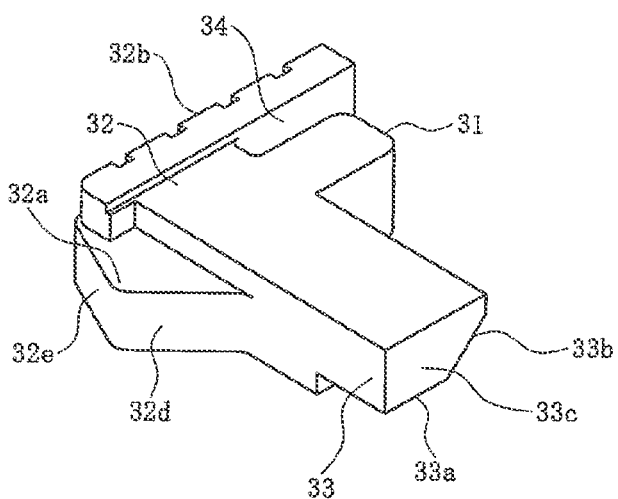
Figure 6A:
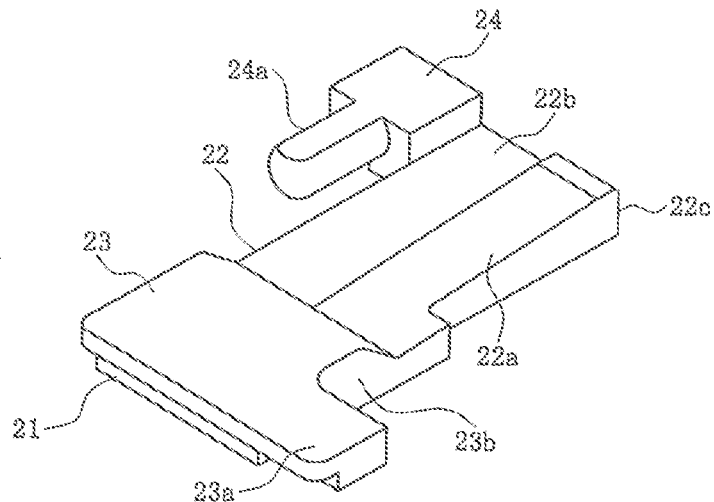
FIG. 6 is a perspective view of a sliding member of the card connector of FIG. 1, in which (a) is a view from above, and (b) and (c) are views from below.
Figure 6B:
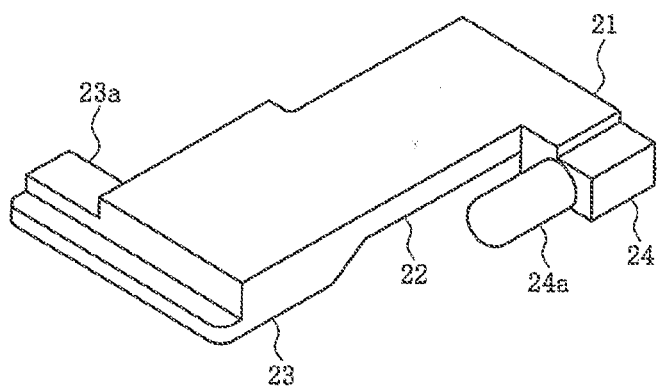
Figure 6C:
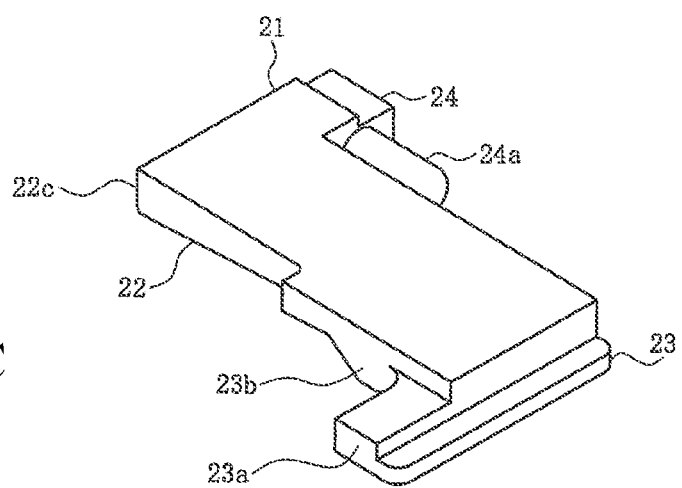
Figure 7A:
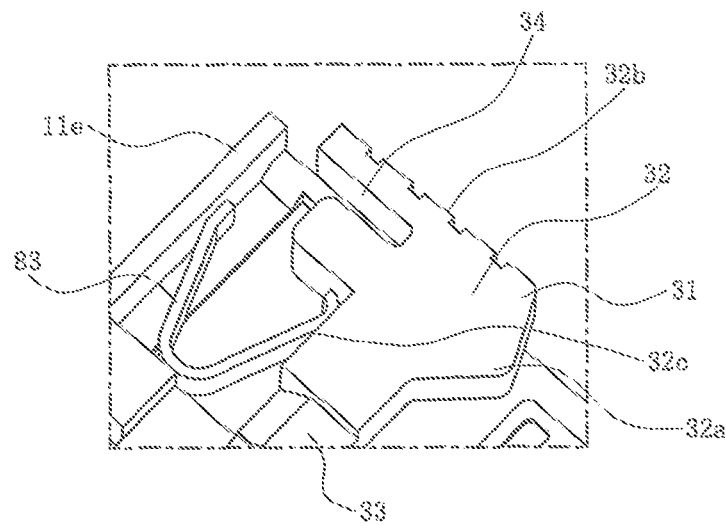
FIG. 7 is a magnified perspective view of the essential parts of modified examples of a second biasing member of the card connector of FIG. 1, in which (a) shows a first modified example, and (b) shows a second modified example.
Figure 7B:
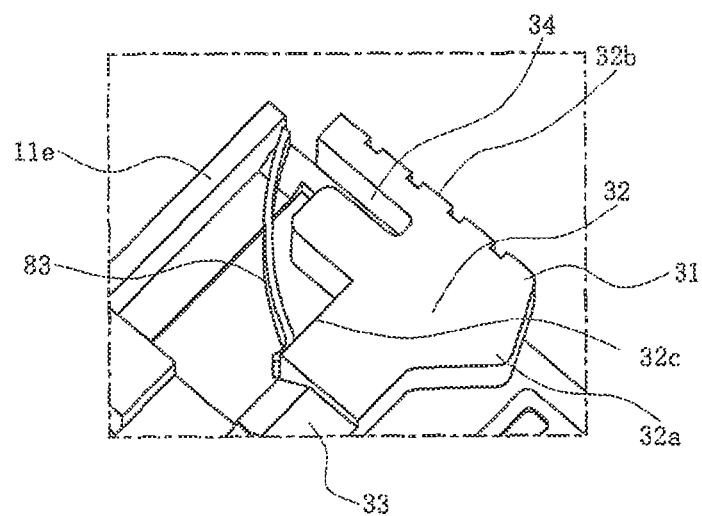

FIGS. 3-4 show an example in which the second biasing member 83 is a coil spring; however, the second biasing member 83 need not necessarily be a coil spring, but may be any form of spring. For example, a roughly V-shaped leaf spring, as shown in FIG. 7(a), is acceptable, as is a roughly crowbar-shaped leaf spring, as shown in FIG. 7(b).

The body part 32 comprises an engagement ridge 32a serving as a card engagement part for engaging with the cutout part 111c of the card 101, a manipulation part 32b facilitating the manipulation performed by a user using the fingers to slide the locking member 31, and a biasing force-receiving part 32c for receiving the biasing force from the second biasing member 83. A front sloped part 32d facing the cutout part 111c of the card 101 and an inward-guiding part 32e that abuts a corner connecting a side edge and one side of a front end 111f of the card 101 and are formed on a surface of the engagement ridge 32a facing the center of the widthwise direction of the housing 11 (the right side in FIG. 3). In the example shown, the inward-guiding part 32e has the shape of an inclined plane; however, the part is not limited to this, and may have a curved surface or any other shape capable of smoothly guiding the corner of the front end 111f of the card 101 inwards. The body part 32 is biased by the second biasing member 83 towards the center of the widthwise direction of the housing 11, causing the engagement ridge 32a to engage with the cutout part 111c of the card 101 inserted into the housing 11, as shown in FIG. 1(b), ensuring that the card 101 does not become dislodged and fall out of the housing 11. When the user manipulates the manipulation part 32b to slide the locking member 31 outwards in the widthwise direction of the housing 11, the engagement of the engagement ridge 32a and the cutout part 111c is released, allowing the card 101 to be moved in a direction opposite the insertional direction and removed from the housing 11.

The sliding control part 33 comprises a flat part 33a, a sloped part 33b connected to an outer end of the flat part 33a (i.e., the end nearer the left side wall 11e in FIG. 3), and an arresting part 33c constituting a front end surface. The sloped part 33b is a sloped surface extending diagonally upward toward the center of the widthwise direction of the housing 11 so that the outer end of the upper surface thereof, i.e., the end farthest from the flat part 33a, is lowest, and the inner end, i.e., the end connected to the flat part 33a, is highest. The upper surface of the flat part 33a is a flat surface of a constant height identical to that of the inner end of the sloped part 33b. When the user slides the locking member 31 from the position shown in FIG. 1(b) outward in the widthwise direction of the housing 11, a tip part 75e of the locking spring member 75 of the shell 71 moves relatively upward along the upper surface of the sloped part 33b, causing the locking part 75d to rise and releasing engagement with the locked part 22c of the body part 22 of the sliding member 21. The sliding member 21 is then moved in a direction opposite the insertional direction of the card 101 by the biasing force of the first biasing member 82, ejecting the card 101 from the housing 11.

The locking member 31 also functions as a stopper for arresting the movement of the sliding member 21 in the direction opposite the insertional direction of the card 101. Specifically, when the locked part 22c of the body part 22 of the sliding member 21 abuts the arresting part 33c of the sliding control part 33 of the locking member 31, the sliding member 21 is arrested and rendered incapable of moving any closer to the rear edge 11r. The engagement of the guide recession 34 with the guide ridge 11j prevents displacement of the locking member 31 in the forward/backward direction.

The shell 71 has a roughly rectangular shape, and comprises an upper plate 72 facing the upper surface 111b of the card 101, and side plates 74 rising vertically from a side edge of the upper plate 72. A plurality of latch holes 73 is formed in the side plates 74, and when the shell 71 is attached to the upper side of the housing 11, latch projections 13 formed in the outer side surfaces of the side walls 11e of the housing 11 latch into the latch holes 73, as shown in FIGS. 1-2, thereby mounting the shell 71 on the housing 11. A locking spring member 75 serving as a shell spring, the spring member 75 being a cantilevered plate member connected at a base end thereof to the upper plate 72 and extending diagonally downward towards rear edge 11r, is formed on the upper plate 72, and a locking spring peripheral opening 76 is formed as a by-product of the process of forming the locking spring member 75.

The locking spring member 75 comprises a base end part 75a, an arm part 75b, a stepped part 75c, a locking part 75d constituting a sliding lock part, and a tip part 75e constituting a lock release abutting part, and functions as an intermediate sliding control member enabling or disabling the sliding of the sliding member 21 in response to the operation of the sliding control part 33 of the locking member 31. The base end of the base end part 75a is linked to the upper plate 72, and the free end, i.e., the tip, thereof extending towards the rear edge 11r has a flat, two-branched shape like that of a tuning fork, one tip thereof being connected to the arm part 75b via the stepped part 75c, and the other tip thereof being connected to the locking part 75d. The arm part 75b is a strip-shaped member extending in the forward/backward direction, and is connected to one tip of the base end part 75a via the stepped part 75c so as to be positioned at a lower height than the base end part 75a. The locking part 75d bends approximately 90° to connect to the other tip of the base end part 75a, and the tip thereof projects so as to face downward. The tip part 75e bends approximately 90° to connect to the tip of the arm part 75b so as to be roughly flush with the tip of the arm part 75b, and the tip thereof projects so as to face the center of the widthwise direction of the housing 11, abutting the sliding control part 33 of the locking member 31.

Figure 1A:
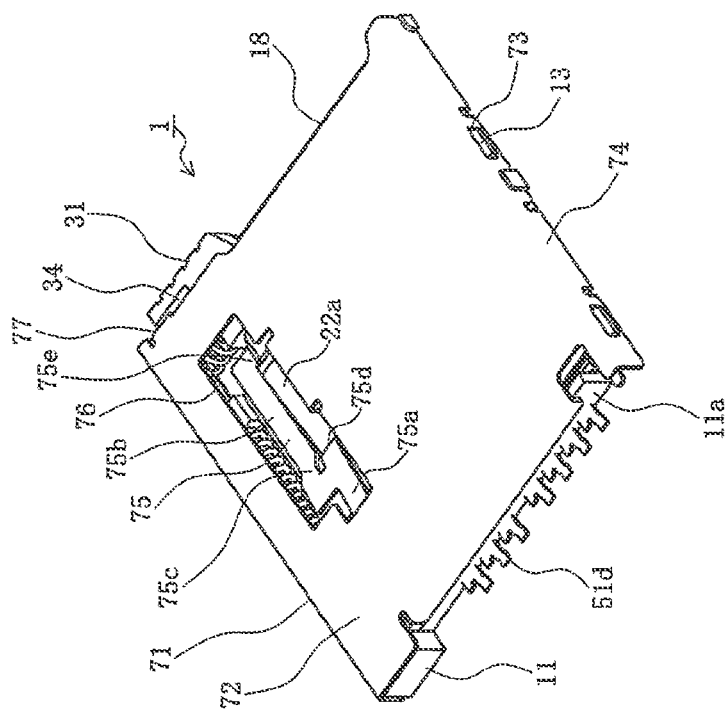

When the card 101 is not inserted and the sliding member 21 and locking member 31 are in the initial position, as shown in FIG. 1(a), the lower surface of the arm part 75b abuts the upper surface of the flat part 22b of the body part 22 of the sliding member 21, the locking part 75d engages with the step-shaped connection between the sloped part 22a of the body part 22 of the sliding member 21 and the card-retaining part 23, and the tip of the tip part 75e abuts the upper surface of the sloped part 33b of the sliding control part 33 of the locking member 31 near the outer end thereof. The locking part 75d is set so that the lower end thereof is lower than the upper surface of the sloped part 22a at the rear end of the body part 22.

When the sliding member 21 is in the locked position along with the inserted card 101, but the locking member 31 is in the initial position, as shown in FIG. 1(b), the lower surface of the arm part 75b faces the upper surface of the card guidance mechanism-receiving part 11h, the locking part 75d engages with the locked part 22c on the body part 22 of the sliding member 21, and the tip of the tip part 75e abuts the upper surface of the sloped part 33b of the sliding control part 33 of the locking member 31 near the outer end thereof. When, in this state, the user slides the locking member 31 outward in the widthwise direction of the housing 11, the tip part 75e moves relatively upward along the upper surface of the sloped part 33b, causing the locking part 75d to rise and releasing engagement with the locked part 22c of the body part 22 of the sliding member 21.

A guide tab 77 rising from the rear edge of the upper plate 72 is further formed at a position on the rear edge facing the guide ridge 11j of the housing 11. The degree of projection, i.e., height (vertical dimension), of the guide tab 77 is lower than that of the side plates 74—for example, no more than half that of the side plates 74—so as not to interfere with the guide ridge 11j. The guide recession 34 of the locking member 31 engages with the guide tab 77 so as to enable sliding in the widthwise direction. In other words, the guide recession 34 of the locking member 31 slidably engages with both the guide ridge 11j of the housing 11 and the guide tab 77 of the shell 71.

A card detection switch for detecting contact between the contact pads of the housing 11 and the terminals 51, thereby detecting that the card 101 is installed within the card connector 1, is provided. The card detection switch is formed by a cantilevered first contact member 62 attached to and near the inner wall 11a, and a second contact member 63 mostly embedded within the bottom wall 11b.

The first contact member 62 comprises an attachment part 62a attached to the inner wall 11a, a cantilevered body part 62b connected at a base end thereof to the attachment part 62a and extending in the lateral direction, and a contact part 62c connected to the free end of the body part 62b. The attachment part 62a is roughly parallel with the inner surface of the inner wall 11a, and, when the card 101 is not inserted in the card connector 1, the body part 62b is inclined with respect to the side surface of the inner wall 11a, and the contact part 62c is positioned towards the front with respect to the insertional direction of the card 101, that is, toward the rear of the card connector. When the card 101 is inserted, the front end 111f of the card 101 contacts the contact part 62c. Meanwhile, the second contact member 63 comprises a plate-shaped attachment part 63a embedded within the bottom wall 11b, and a contact part 63b a base of which is attached to the attachment part 63a, a tip of which is exposed in the bottom wall 11b.

When the card 101 is not inserted, the body part 62b of the first contact member 62 contacts the contact part 63b of the second contact member 63, as shown in FIG. 3, with the result that the first contact member 62 and the second contact member 63 are in contact, putting the card detection switch in an electrified state, i.e., on. However, when the card 101 is inserted and reaches a position at which the contact pads thereof and the terminals 51 contact, the contact part 62c of the first contact member 62 is pressed and displaced in the direction of the inner wall 11a by the front end 111f of the card 101, moving the body part 62b of the first contact member 62 away from the contact part 63b of the second contact member 63. Contact between the first contact member 62 and the second contact member 63 is thereby broken, and the card detection switch is de-electrified, i.e., turned off, thereby detecting that the card 101 has reached a position at which the contact pads and the terminals 51 contact.

FIGS. 8-9 illustrate the operation of the card 101 into the card connector 1. First, a user inserts the card 101 into the card insertion space formed between the housing 11 and the shell 71 through the insertion slot 18 on the rear of the card connector 1. The card 101 is inserted in an orientation such that the front end 111f thereof faces the front edge 11f of the housing 11, the underside thereof faces the bottom wall 11b, and the upper surface 111b faces the upper plate 72 of the shell 71. Here, the locking member 31 is positioned at a first position 31-1 constituting an initial position by the biasing force of the second biasing member 83, and the engagement ridge 32a of the body part 32 projected within the insertion slot 18 towards the center of the widthwise direction of the housing 11, causing the corner connecting the side edge and one end of the front end 111f (in FIG. 8(a), the left end) of the card 101 to abut the inward-guiding part 32e formed on the surface of the engagement ridge 32a facing the center of the widthwise direction of the housing 11.

When the user inserts the card 101 into the card insertion space, the corner of the card 101 slides along the inward-guiding part 32e in the direction of the front edge 11f of the housing 11, causing the locking member 31 to move outward in the widthwise direction of the housing 11 against the biasing force of the second biasing member 83 and arrive at a second position 31-2. At this time, the elongated groove-shaped guide recession 34 formed in the body part 32 and extending in the widthwise direction of the housing 11 is engaged with the guide ridge 11j of the housing 11 and the guide tab 77 of the shell 71, allowing the locking member 31 to slide smoothly outward in the widthwise direction of the housing 11.

Even if a user mistakenly rams or presses the front end 111f of the card 101 against the manipulation part 32b of the locking member 31, applying a large external force in direction of the front edge 11f to the locking member 31, the engagement of the guide recession 34 with both the guide ridge 11j of the housing 11 and the guide tab 77 of the shell 71 allows the locking member 31 to withstand the external force, preventing damage to and breakage of the locking member 31, housing 11 and/or shell 71, and maintaining the smoothness of the sliding action of the locking member 31.

When the locking member 31 reaches the second position 31-2 in this way, the engagement ridge 32a of the body part 32 no longer projects toward the center of the widthwise direction of the housing 11, allowing the card 101 to advance along the card guidance mechanism-receiving part 11h. The sliding control part 33 of the locking member 31 moves outward in the widthwise direction of the housing 11, causing the tip part 75e of the locking spring member 75 of the shell 71 to move relatively upward along the upper surface of the sloped part 33b of the sliding control part 33 from a first position 75e-1 constituting an initial position to a second position 75e-2. As a result, the locking spring member 75 also rises from a first position 75-1 constituting a initial position to a second position 75-2, causing the lower surface of the arm part 75b to separate from the upper surface of the flat part 22b of the body part 22 of the sliding member 21 and the lower end of the locking part 75d to separate from the sloped part 22a of the body part 22 of the sliding member 21, thus allowing the sliding member 21 to slide smoothly without interfering with the locking spring member 75.

Next, when the user pushes the card 101 further inward, the front end retaining part 23a and the side edge retaining part 23b of the sliding member 21 retain the front end 111f and side edge of the card 101, as shown in FIG. 8(a), with the result that the card 101 is retained by the sliding member 21 and moves toward the inner wall 11a along with the sliding member 21. At this time, the pressure exerted by the user is conveyed from the front end of the card 101 via the front end retaining part 23a to the sliding member 21. The sliding member 21 then compresses the first biasing member 82 constituted by the coil spring, and the sliding member 21 and card 101 are subjected to repulsion from the first biasing member 82; however, because the force of this repulsion is less than that of the pressure exerted by the user, the sliding member 21 and card 101 move against the repulsion. At this time, the sliding member 21 slides along the card guidance mechanism-receiving part 11h, and the card 101 moves forward along with the sliding member 21.

As shown in FIG. 9(a), the sliding member 21 and card 101 reach and are arrested at the locked position constituting the most advanced position. In the locked position, the card 101 is capable of sending and receiving data with a processing means or the like of the electronic device in which the card connector 1 is installed. When the card 101 is in the locked position, the contact parts 51c of the terminals 51 of the card connector 1 contact and electrify the contact pads of the card 101.

The contact part 62c of the first contact member 62 is pressed and displaced in the direction of the inner wall 11a by the front end 111f of the card, moving the body part 62b of the first contact member 62 away from the contact part 63b of the second contact member 63. Contact between the first contact member 62 and the second contact member 63 is thereby broken, and the card detection switch is turned off, thereby detecting that the card 101 has reached a position at which the contact pads and the terminals 51 contact.

When the card 101 reaches the locked position, the cutout part 111c thereof reaches the rear edge 11r of the housing 11 and faces the engagement ridge 32a of the body part 32 of the locking member 31. The locking member 31 is thereby moved by the biasing force of the second biasing member 83 from the second position 31-2 toward the center of the widthwise direction of the housing 11, returning to the first position 31-1. The engagement ridge 32a of the body part 32 then engages with the cutout part 111c of the card 101, causing the front sloped part 32d of the body part 32 to face the cutout part 111c. The card 101 is thus locked in the locked position and is incapable of moving in the direction opposite the insertional direction, preventing the card 101 from being dislodged from the housing 11. In this way, the locking member 31 automatically moves from the first position 31-1 to the second position 31-2 when the card 101 is inserted in the card insertion space, and the locking member 31 automatically returns to the first position 31-1 and locks the card 101 when the card 101 reaches the locked position, freeing the user from the need to manipulate the locking member 31 and improving ease of use.

When the locking member 31 returns to the first position 31-1, the sliding control part 33 of the locking member 31 moves toward the center of the widthwise direction of the housing 11, causing the tip part 75*e* of the locking spring member 75 of the shell 71 to move relatively downward from the second position 75*e*-2 along the upper surface of the sloped part 33*b* of the sliding control part 33 back to the first position 75*e*-1. As a result, the locking spring member 75 as a whole also returns downward from the second position 75-2 to the first position 75-1, and the locking part 75*d* returns downward from a second position 75*d*-2 to a first position 75*d*-1. At this time, because the sliding member 21 is also in the locked position along with the card 101, the locked part 22*c* formed in the rear end of the sloped part 22*a* of the body part 22 of the sliding member 21 is in a position corresponding to the locking part 75*d* of the locking spring member 75. The locked part 22*c* thus engages with the locking part 75*d* having returned downward from the second position 75*d*-2 to the first position 75*d*-1.

The sliding member 21 is thereby locked in the locked position by the locking spring member 75, preventing movement thereof in the direction opposite the insertional direction even if the pressure in the insertional direction exerted upon the front end retaining part 23*a* of the sliding member 21 via the card 101. Therefore, the card 101 is not moved by the sliding member 21 in the direction opposite the insertional direction, and is not dislodged from the housing 11.

The locking member 31 further functions to prevent improper insertion of the card 101. When the card 101 is inserted in the proper orientation—i.e., with the front end 111*f* facing the front edge 11*f* of the housing 11, the lower surface facing the bottom wall 11*b*, and the upper surface 111*b* facing the upper plate 72 of the shell 71—the diagonal cutout part 111*c* faces the engagement ridge 32*a* of the body part 32 of the locking member 31 when the card 101 reaches the locked position, allowing the locking member 31 to return to the first position 31-1.

However, if the card 101 is not inserted into the card connector 1 in the proper orientation, i.e., is inserted in an irregular orientation, a corner of the card 101 apart from that having the cutout part 111*c* faces the engagement ridge 32*a*, preventing the locking member 31 from returning to the first position 31-1. As a result, the sliding control part 33 does not move towards the center of the widthwise direction of the housing 11, and the tip part 75*e* of the locking spring member 75 of the shell 71 does not return to the first position 75*e*-1, with the result that the locking part 75*d* likewise does not return to the first position 75*d*-1, and the locked part 22*c* of the sliding member 21 is not locked by the locking part 75*d*. As a result, the sliding member 21 is kept in a slidable state, and will move in the direction opposite the insertional direction, ejecting the card 101, if the pressure in the insertion direction exerted upon the front end retaining part 23*a* via the card 101 is released. Thus, an improperly inserted card 101 is maintained in the locked position and is ejected, prevented improper insertion.

FIGS. 10-1 illustrate the operation of ejecting the card 101 from the card connector 1. First, the user manipulates the manipulation part 32*b* of the locking member 31, moving the locking member 31 outward in the widthwise direction of the housing 11 against the biasing force of the second biasing member 83 until it reaches the second position 31-2, as shown in FIG. 10(*a*). At this time, the elongated groove-shaped guide recession 34 formed in the body part 32 and extending in the widthwise direction of the housing 11 is engaged with the guide ridge 11*j* of the housing 11 and the guide tab 77 of the shell 71, allowing the locking member 31 to slide smoothly outward in the widthwise direction of the housing 11.

When the locking member 31 reaches the second position 31-2, the front sloped part 32*d* of the body part 32 thereof moves away from the cutout part 111*c* of the card 101, releasing the engagement of the engagement ridge 32*a* of the body part 32 and the cutout part 111*c* of the card 101. The card 101 is thus unlocked from the locked position, becoming capable of moving in the direction opposite the insertional direction.

When the locking member 31 moves to the second position 31-2, the sliding control part 33 of the locking member 31 moves outward in the widthwise direction of the housing 11, causing the tip part 75*e* of the locking spring member 75 of the shell 71 to move relatively upward along the upper surface of the sloped part 33*b* of the sliding control part 33 from the first position 75*e*-1 to the second position 75*e*-2. As a result, the locking spring member 75 as a whole also rises from the first position 75-1 to the second position 75-2, causing the locking part 75*d* to rise from the first position 75*d*-1 to the second position 75*d*-2, and releasing the engagement of the locking part 75*d* and the locked part 22*c* of the body part 22 of the sliding member 21. The locking of the sliding member 21 by the locking spring member 75 is thereby released, allowing the sliding member 21 to move in the direction opposite the insertional direction. The sliding member 21 is then moved away from the inner wall 11*a* in the direction opposite the insertional direction along with the card 101 by the biasing force of the first biasing member 82. The card 101 is then ejected from the insertion slot 18.

When the card 101 is ejected, as shown in FIG. 11(*a*), the locking member 31 is moved by the biasing force of the second biasing member 83 from the second position 31-2 toward the center of the widthwise direction of the housing 11, returning to the first position 31-1. When the locking member 31 returns to the first position 31-1, the sliding control part 33 of the locking member 31 moves toward the center of the widthwise direction of the housing 11, causing the tip part 75*e* of the locking spring member 75 of the shell 71 to move relatively downward from the second position 75*e*-2 along the upper surface of the sloped part 33*b* of the sliding control part 33 back to the first position 75*e*-1. As a result, the locking spring member 75 as a whole also returns downward from the second position 75-2 to the first position 75-1.

The sliding member 21 moves along with the card 101 in the direction opposite the insertional direction, and the locked part 22*c* of the body part 22 thereof is arrested upon coming into contact with the arresting part 33*c* constituting the front end surface of the sliding control part 33 of the locking member 31.

The first contact member 62, the contact part 62*c* of which had been pressed and displaced in the direction of the inner wall 11*a* by the front end 111*f* of the card, returns to its original position via its own elasticity, and the body part 62*b* thereof comes into contact with the contact part 63*b* of the second contact member 63. The card detection switch is thereby turned on, thereby detecting that the card 101 is not in a position at which the contact pads and the terminals 51 contact.

In this embodiment, as described above, the card connector 1 comprises a housing 11 for receiving a card 101 provided with contact pads, and terminals 51, attached to the housing 11, for contacting the contact pads of the card 101. The card connector 1 also comprises a sliding member 21 for retaining the card 101 inserted from the rear edge 11r of the housing 11 towards the front edge 11f and sliding in the forward/backward direction of the housing 11; a first biasing member 82 for biasing the sliding member 21 towards the rear edge 11r; a locking member 31, provided on the rear edge 11r of the housing 11, for sliding in the widthwise direction of the housing 11 and locking the card 101 received in the housing 11; and a second biasing member 83 for biasing the locking member 31 towards the center of the widthwise direction of the housing 11; the locking member 31 comprising a sliding control part 33 for controlling the sliding of the sliding member 21; the sliding control part 33 preventing the sliding member 21 from sliding when the locking member 31 is in a first position for blocking the sliding of the card 101 in the forward/backward direction of the housing 11, and allowing the sliding member 21 to slide when the locking member 31 is in a second position permitting the card 101 to slide in the forward/backward direction of the housing 11.

The sliding member 21 is thereby capable of smoothly sliding in the forward/backward direction and guiding the card 101 in the forward/backward direction with consistent reliability. In addition, the locking member 31 is capable of smoothly performing locking and unlocking operations, allowing the card 101 to be reliably and easily inserted and ejected. The reliability of the card connector 1 is thereby increased.

The locking member 31 comprises the engagement ridge 32a, which engages with the cutout part 111c formed on one end of the rear end 111r of the card 101 received in the housing 11 when the locking member 31 is in the first position. This allows for reliable retention of the card 101, preventing the card 101 from being dislodged. If the card 101 is improperly inserted into the card connector 1, the engagement ridge 32a will not engage with the cutout part 111c, allowing improper insertion of the card 101 to be prevented.

The card connector 1 further comprises the shell 71, which is attached to the housing 11 and has an upper plate 72 for at least partially covering the housing 11 and the card 101 inserted in the housing 11; the housing 11 comprising the guide ridge 11j extending along the rear edge 11r; the shell 71 comprising a guide tab 77 formed at a position on the upper plate 72 facing the guide ridge 11j; the locking member 31 comprising an elongated groove-shaped guide recession 34 extending in the widthwise direction of the housing 11; and the guide recession 34 being capable of slidably engaging with the guide ridge 11j and the guide tab 77. The locking member 31 is thus capable of smoothly sliding in the widthwise direction of the housing 11. Even if a user mistakenly rams or presses the card 101 against the locking member 31, applying a large external force in direction of the front edge 11f to the locking member 31, the engagement of the guide recession 34 with both the guide ridge 11j of the housing 11 and the guide tab 77 of the shell 71 allows the locking member 31 to withstand the external force, preventing damage to and breakage of the locking member 31, housing 11 and/or shell 71, and maintaining the smoothness of the sliding action of the locking member 31.

The upper plate 72 further comprises a locking spring member 75 for enabling or disabling the sliding of the sliding member 21 according to the position of the sliding control part 33, the locking spring member 75 comprising a tip part 75e abutting the sliding control part 33 and a locking part 75d capable of engaging with the locked part 22c of the sliding member 21. It is thus possible to indirectly enable or disable the sliding of the sliding member 21 via the locking spring member 75 by sliding the locking member 31 in the widthwise direction of the housing 11.

The sliding control part 33 further comprises a sloped part 33b extending diagonally upward towards the center of the widthwise direction of the housing 11. When the locking member 31 slides from the first position to the second position, the tip part 75e moves upward along the sloped part 33b, and the locking part 75d releases its engagement with the locked part 22c. It is thus possible to enable the sliding member 21 to slide and easily eject the card 101 by sliding the locking member 31 from the first position to the second position.

Referring now to FIGS. 12-7, referring to a second embodiment of the Present Disclosure, elements having structures identical to those of the first embodiment will be labeled with the same numbers, and description thereof will be omitted. Description of operations and effects identical to those of the first embodiment will also be omitted. In this embodiment, a locking spring member 75 is not formed on the upper plate 72 of the shell 71. In the example shown, a sliding member-restraining spring member 78 for biasing the sliding member 21 downward from above, but this sliding member-restraining spring member 78 may be omitted, as appropriate.

Figure 17A:
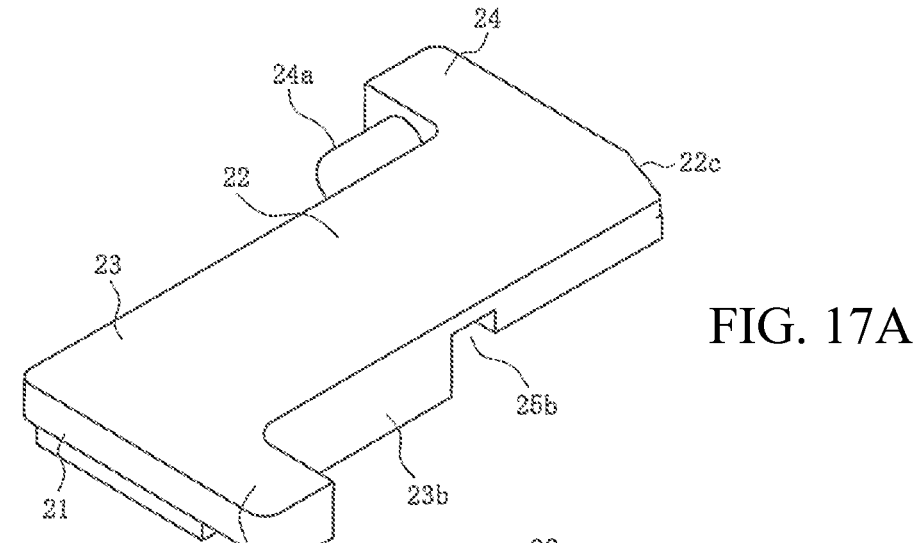
FIG. 17 is a perspective view of a sliding member of the card connector of FIG. 12, in which (a) is a view from above, and (b) and (c) are views from below.
Figure 17B:
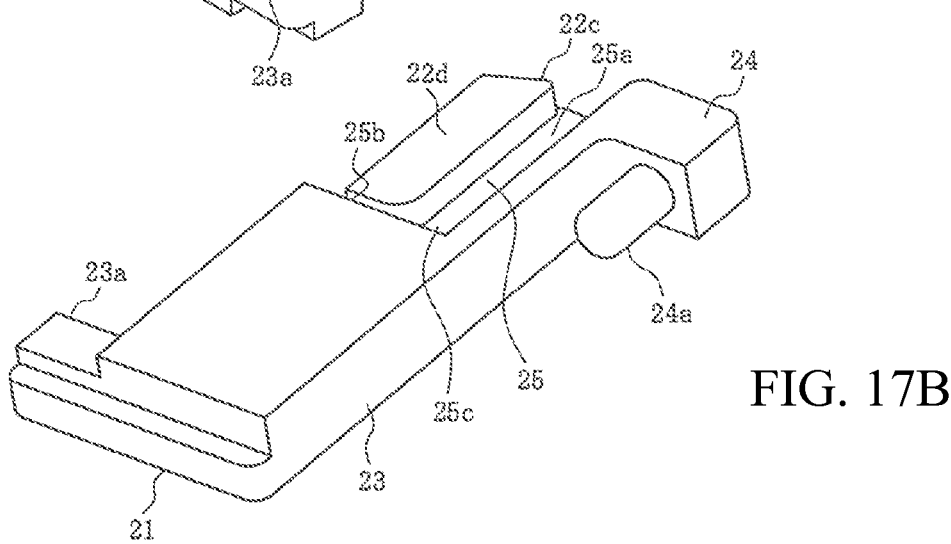
Figure 17C:
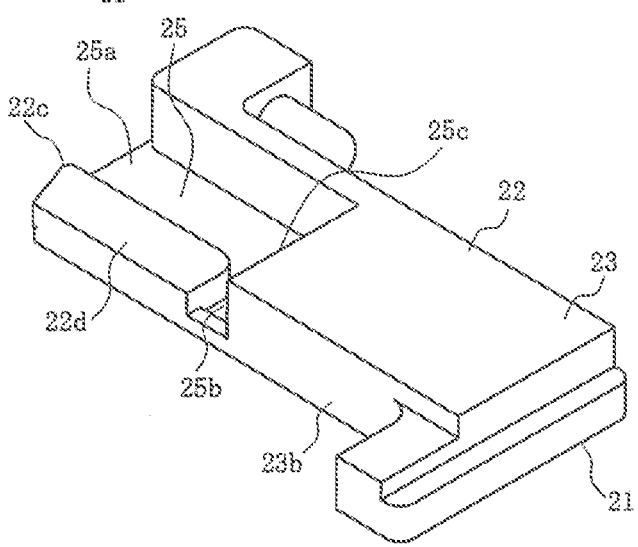

The body part 22 of the sliding member 21 in this embodiment does not comprise a sloped part 22a or flat part 22b, and the upper surface thereof is flat. However, a sliding control recession 25 is formed in the lower surface of the body part 22, as shown in FIG. 17. The sliding control recession 25 is a groove-shaped recession having an overall rough letter-L shape as seen from below, and comprises a broad groove-shaped main recession 25a extending in the forward/backward direction, a narrow groove-shaped engagement recession 25b extending from the front end of the main recession 25a towards the center of the widthwise direction of the housing 11, and an arresting part 25c constituting a front end wall of the main recession 25a and the engagement recession 25b. A part of the body part 22 having two sides thereof delineated by the roughly L-shaped sliding control recession 25 forms an island 22d having a vertical dimension, i.e., thickness, that is less than the other parts of the body part 22. The lower surface of the island 22d is formed so as to be higher than the other parts of the body part 22 and the lower surface of the card-retaining part 23. The vertical wall formed on the rear end of the island 22d functions as a locked part 22c. The card-retaining part 23 and biasing force-receiving part 24 are similar to those of the first embodiment; description thereof will therefore be omitted.

Figure 16A:
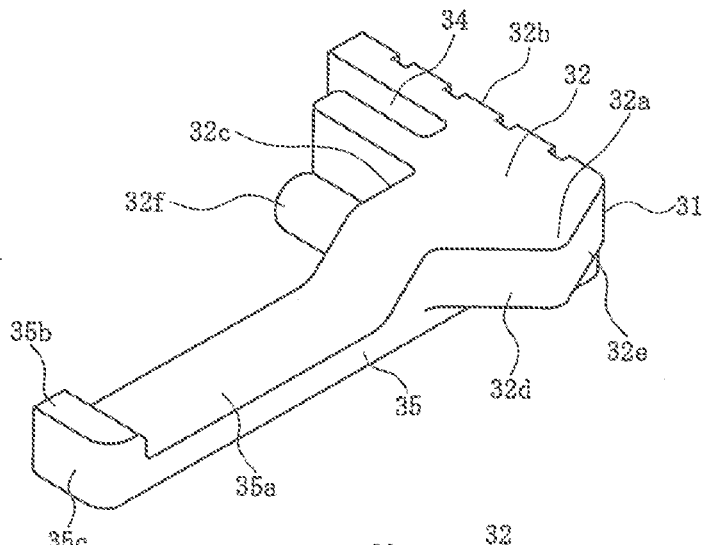
FIG. 16 is a perspective view of a locking member of the card connector of FIG. 12, in which (a) is a view from above, and (b) and (c) are views from below.
Figure 16B:
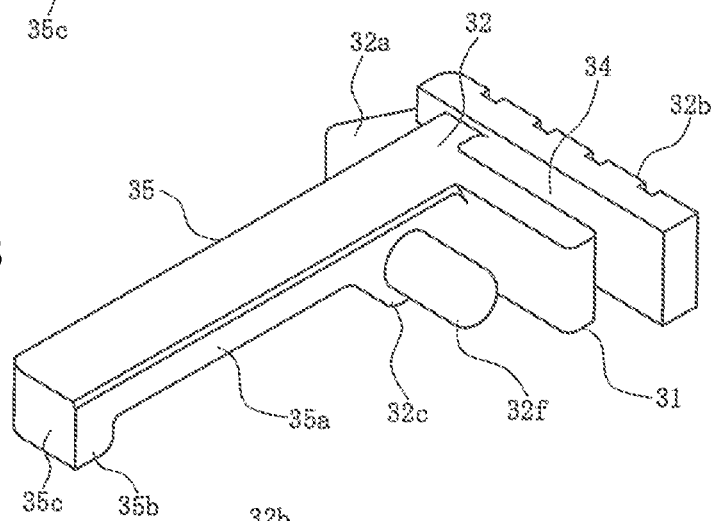
Figure 16C:
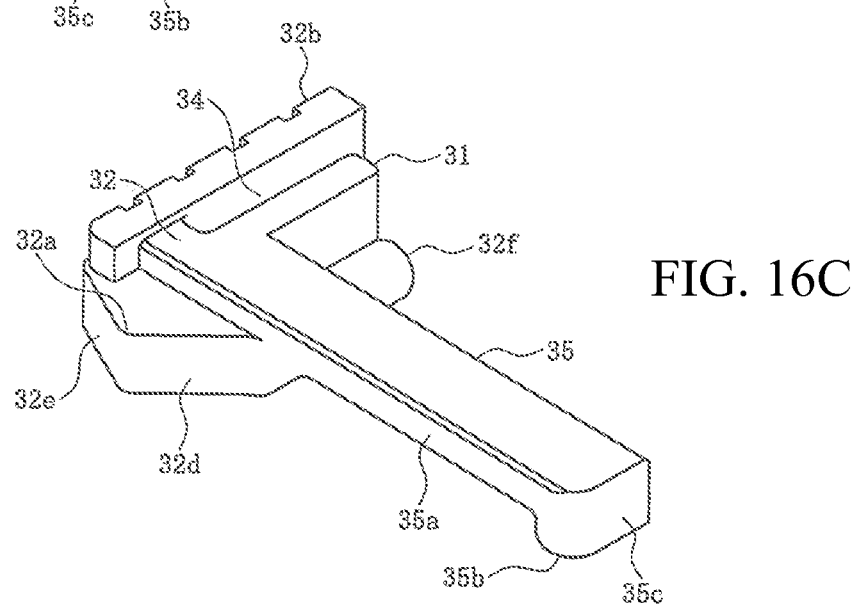

As shown in FIG. 16, the locking member 31 in this embodiment is further provided with a differently shaped sliding control part 35 instead of the sliding control part 33 of the first embodiment. The sliding control part 35 comprises an arm 35a connected at a rear end thereof to the front end of the body part 32 and extending forward, an engagement ridge 35b projecting upward from the front end of the arm 35a, and an arresting part 35c constituting a front end surface of the arm 35a and the engagement ridge 35b and acting as a sliding lock part.

Figure 12B:
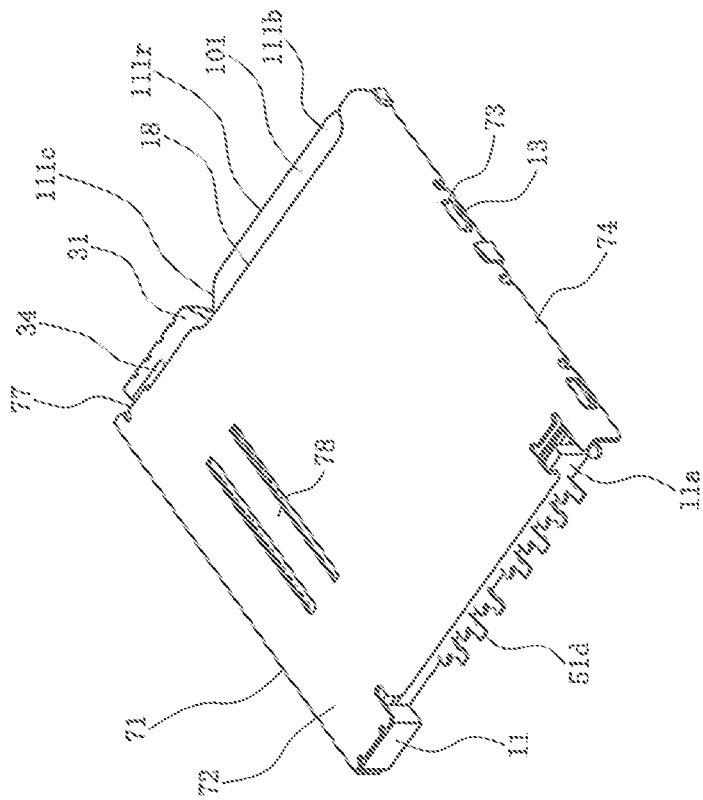
FIG. 12 is a perspective view of a card connector according to a second embodiment of the Present Disclosure, showing a state in which a card is (a) not inserted, and (b) inserted.
Figure 12A:
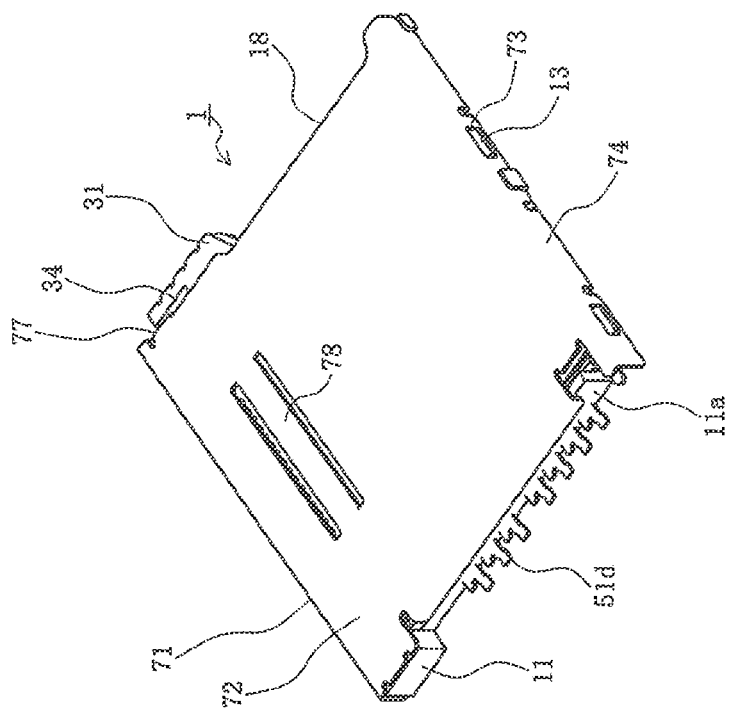
Figure 14:
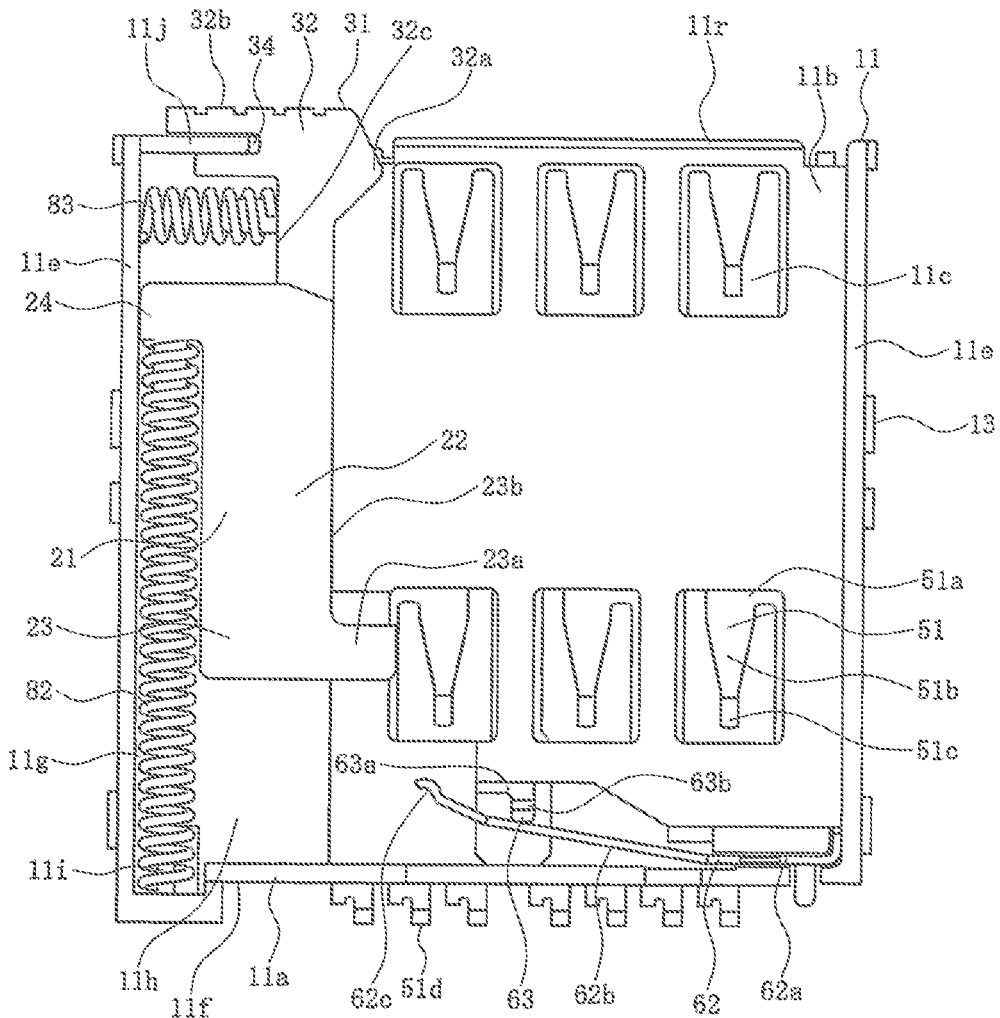
FIG. 14 is a plan view of the card connector of FIG. 12, with a shell thereof removed.
Figure 15:
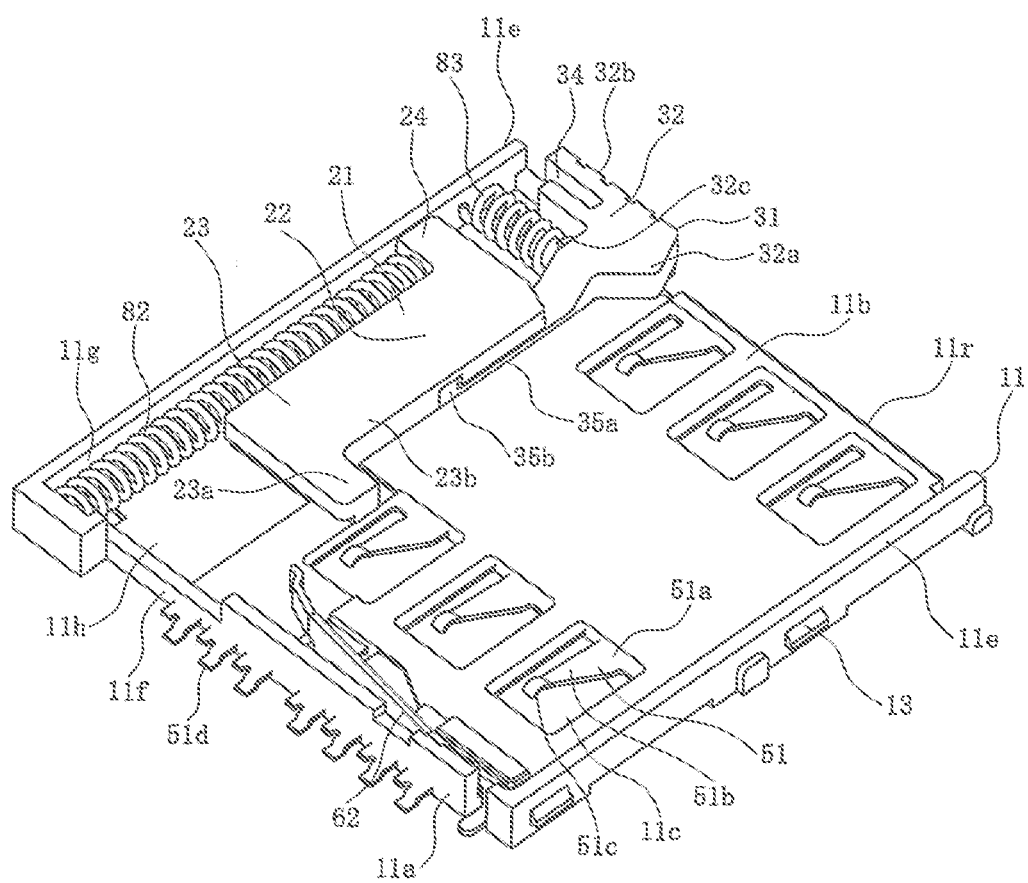
FIG. 15 is a perspective view of the card connector of FIG. 14.

As shown in FIG. 12(a) and the like, when the card 101 is not inserted and the sliding member 21 and locking member 31 are in the initial position, the arm 35a is positioned beneath the island 22d of the sliding member 21. This is why the arm 35a is formed so as to have a vertical dimension, i.e., thickness, less than that of the body part 32, and the upper surface thereof is formed so as to be lower than the upper surface of the body part 32. When the sliding member 21 and the locking member 31 are in the initial position, the engagement ridge 35b is received within the engagement recession 25b of the sliding member 21.

When the sliding member 21 is in the locked position along with the inserted card 101 but the initial position is in the initial position, as shown in FIG. 12(b), the arresting part 35c positioned on the front end of the locking member 31 abuts and engages with the locked part 22c positioned on the rear end of the sliding member 21. When, in this state, the user slides the locking member 31 outward in the widthwise direction of the housing 11, the arresting part 35c slides along the locked part 22c in the widthwise direction of the housing 11 and releases its engagement with the locked part 22, and the engagement ridge 35b advances into the main recession 25a, allowing the sliding member 21 to slide in the forward/backward direction.

The body part 32 and guide recession 34 are similar to those of the first embodiment; description thereof will therefore be omitted. Incidentally, a locking projection 32f for locking with the second biasing member 83 is formed on the biasing force-receiving part 32c of the body part 32 in the example shown, but this locking projection 32f may be omitted, as appropriate.

Thus, whereas the sliding control part 33 of the locking member 31 enables and disables the sliding of the sliding member 21 via the locking spring member 75 functioning as a intermediate sliding control member, i.e., indirectly, in the first embodiment, the sliding control part 35 of the locking member 31 enables and disables the sliding of the sliding member 21 without the mediation of another member, i.e., directly, in this embodiment.

The structure of the card connector 1 is otherwise similar to that of the first embodiment; description thereof will therefore be omitted.

Figure 18B:
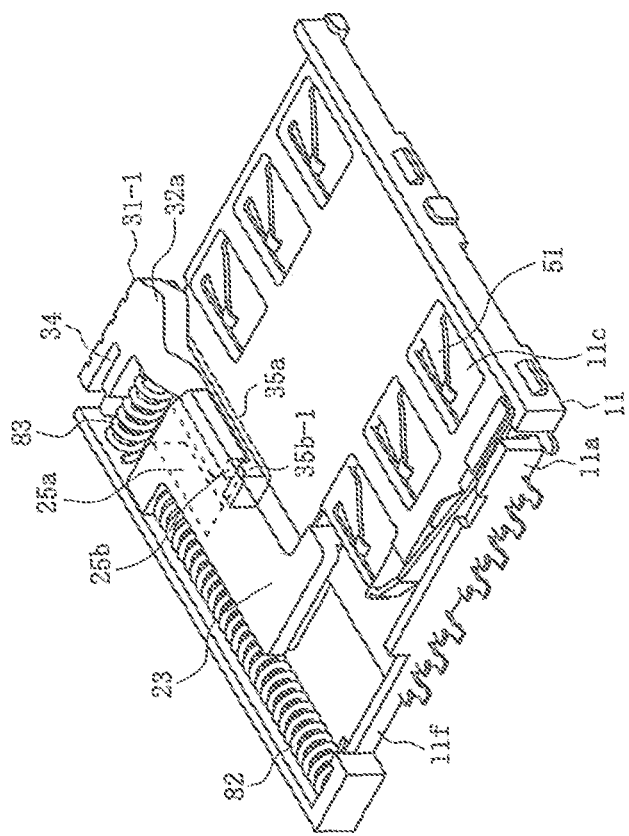
FIG. 18 is an illustration of the second embodiment of the Present Disclosure in which a card is in the process of being inserted, in which (a) and (b) are, respectively, an upper surface view and a perspective view with a shell thereof removed.
Figure 18A:
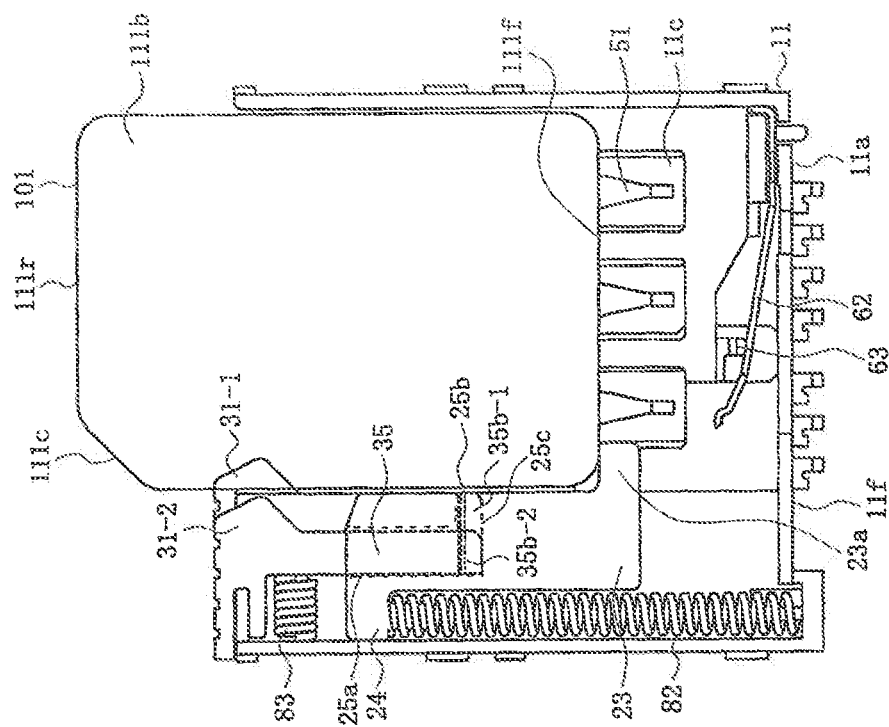
Figure 22:
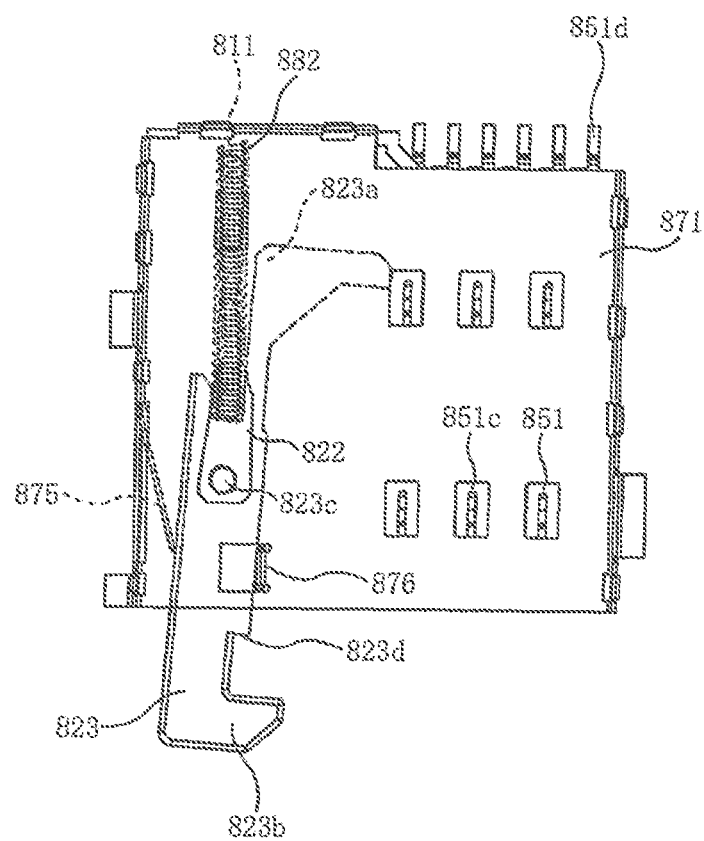
FIG. 22 is an illustration of a conventional card connector.

FIGS. 18-9 illustrate the operation of the card connector 1 having the configuration described in the second embodiment. To insert the card 101, a user inserts the card 101 into the card insertion space formed between the housing 11 and the shell 71 through the insertion slot 18 on the rear of the card connector 1 using the fingers or the like. The card 101 is inserted in an orientation such that the front end 111f thereof faces the front edge 11f of the housing 11, the underside thereof faces the bottom wall 11b, and the upper surface 111b faces the upper plate 72 of the shell 71. For ease of illustration, FIGS. 18(a) and 19(a) show states in which the shell 71 has been removed, and FIGS. 18(b) and 19(b) show states in which the card 101 has also been removed. Here, the locking member 31 is positioned at a first position 31-1 constituting an initial position by the biasing force of the second biasing member 83, and the engagement ridge 32a of the body part 32 projected within the insertion slot 18 towards the center of the widthwise direction of the housing 11, causing the corner connecting the side edge and one end of the front end 111f (in FIG. 18(a), the left end) of the card 101 to abut the inward-guiding part 32e formed on the surface of the engagement ridge 32a facing the center of the widthwise direction of the housing 11.

When the user inserts the card 101 into the card insertion space, the corner of the card 101 slides along the inward-guiding part 32e in the direction of the front edge 11f of the housing 11, causing the locking member 31 to move outward in the widthwise direction of the housing 11 against the biasing force of the second biasing member 83 and arrive at a second position 31-2.

When the locking member 31 reaches the second position 31-2 in this way, the engagement ridge 32a of the body part 32 no longer projects toward the center of the widthwise direction of the housing 11, allowing the card 101 to advance along the card guidance mechanism-receiving part 11h. Likewise, the engagement ridge 35b on the front end of the sliding control part 35 of the locking member 31 moves from a first position 35b-1 constituting an initial position, i.e., a position within the engagement recession 25b in the sliding control recession 25 of the sliding member 21, outward in the widthwise direction of the housing 11, and reaches a second position 35b-2, i.e., a position within the main recession 25a of the sliding control recession 25 outside the engagement recession 25b. As a result, the engagement ridge 35b is released from its engagement with the engagement recession 25b and becomes capable of relative movement in the forward/backward direction within the main recession 25a, allowing the sliding member 21 to slide in the forward/backward direction along the card guidance mechanism-receiving part 11h.

Next, when the user pushes the card 101 further inward, the front end retaining part 23a and the side edge retaining part 23b of the sliding member 21 retain the front end 11 if and side edge of the card 101, as shown in FIG. 18(a), with the result that the card 101 is retained by the sliding member 21 and moves toward the inner wall 11a along with the sliding member 21.

As shown in FIG. 19(a), the sliding member 21 and card 101 reach and are arrested at the locked position constituting the most advanced position. When the card 101 reaches the locked position, the cutout part 111c thereof reaches the rear edge 11r of the housing 11 and faces the engagement ridge 32a of the body part 32 of the locking member 31. The locking member 31 is thereby moved by the biasing force of the second biasing member 83 from the second position 31-2 toward the center of the widthwise direction of the housing 11, returning to the first position 31-1. The engagement ridge 32a of the body part 32 then engages with the cutout part 111c of the card 101, causing the front sloped part 32d of the body part 32 to face the cutout part 111c. The card 101 is thus locked in the locked position and is incapable of moving in the direction opposite the insertional direction, preventing the card 101 from being dislodged from the housing 11.

When the sliding member 21 reaches the locked position along with the card 101, the engagement ridge 35b on the front end of the sliding control part 35 of the locking member 31 projects from the main recession 25a of the sliding member 21 to the rear. As a result, the arresting part 35c constituting the front end surface of the engagement ridge 35b takes up a position with respect to the forward/backward direction that is identical to or rearward of the position of the locked part 22c positioned on the rear end of the sliding member 21.

When the locking member 31 subsequently returns to the first position 31-1, the sliding control part 35 of the locking member 31 moves toward the center of the widthwise direction of the housing 11, causing the engagement ridge 35b to similarly return from the second position 35b-2 to the first position 35b-1. At this time, the projection of the engagement ridge 35b rearward from the main recession 25a of the sliding member 21 allows for movement towards the center of the widthwise direction of the housing 11. When the engagement ridge 35b returns to the first position 35b-1, the arresting part 35c constituting the front end surface of the engagement ridge 35b takes up a position facing the locked part 22c of the sliding member 21. The locked part 22c is thereby engaged with the arresting part 35c and locked. The sliding member 21 is thereby locked in the locked position by the sliding control part 35, preventing movement thereof in the direction opposite the insertional direction even if the pressure in the insertional direction exerted upon the front end retaining part 23a of the sliding member 21 via the card 101. Therefore, the card 101 is not moved by the sliding member 21 in the direction opposite the insertional direction, and is not dislodged from the housing 11.

The operation of inserting the card 101 is otherwise similar to the first embodiment; description thereof will therefore be omitted.

FIGS. 20-1 illustrate an operation of ejecting the card 101 from the card connector 1. First, the user manipulates the manipulation part 32b of the locking member 31 using the fingers, moving the locking member 31 outward in the widthwise direction of the housing 11 against the biasing force of the second biasing member 83 until it reaches the second position 31-2, as shown in FIG. 20. For ease of illustration, FIGS. 20(a), 21(a) and 21(b) show states in which the shell 71 has been removed, and FIG. 20(b) shows a state in which the card 101 has also been removed.

When the locking member 31 reaches the second position 31-2, the front sloped part 32d of the body part 32 thereof moves away from the cutout part 111c of the card 101, releasing the engagement of the engagement ridge 32a of the body part 32 and the cutout part 111c of the card 101. The card 101 is thus unlocked from the locked position, becoming capable of moving in the direction opposite the insertional direction.

When the locking member 31 moves to the second position 31-2, the engagement ridge 35b on the front end of the sliding control part 35 of the locking member 31 also moves from the first position 35b-1 to the second position 35b-2. Thus, the arresting part 35c constituting the front end surface of the engagement ridge 35b moves from a position facing the locked part 22c of the sliding member 21 to a position facing the main recession 25a, thereby releasing the engagement of the arresting part 35c and the locked part 22c. As a result, the engagement ridge 35b becomes capable of relatively moving in the forward/backward direction within the main recession 25a, and the sliding member 21 becomes capable of moving in the direction opposite the insertional direction. The sliding member 21 is thus moved away from the inner wall 11a along with the card 101 by the biasing force of the first biasing member 82, and is moved in the direction opposite the insertional direction. The card 101 is then ejected from the insertion slot 18.

The sliding member 21 moves in the direction opposite the insertional direction along with the card 101, and is arrested when the arresting part 25c constituting the front end wall of the main recession 25a comes into contact with the arresting part 35c constituting the front end surface of the engagement ridge 35b relatively moving within the main recession 25a.

When the card 101 is ejected, as shown in FIG. 21, the locking member 31 is moved by the biasing force of the second biasing member 83 from the second position 31-2 toward the center of the widthwise direction of the housing 11, returning to the first position 31-1. When the locking member 31 subsequently returns to the first position 31-1, the sliding control part 35 of the locking member 31 moves toward the center of the widthwise direction of the housing 11, causing the engagement ridge 35b to similarly return from the second position 35b-2 to the first position 35b-1. At this time, the arresting part 35c abuts the arresting part 25c constituting the front end wall of the main recession 25a, causing the engagement ridge 35b to advance into and be received in the engagement recession 25b extending from the front end of the main recession 25a towards the center of the widthwise direction of the housing 11.

The operation of ejecting the card 101 is otherwise similar to the first embodiment; description thereof will therefore be omitted.

In this way, the sliding member 21 of this embodiment comprises a sliding control recession 25 capable of engaging with the sliding control part 35, and the sliding control part 35 comprises an engagement ridge 35b capable of engaging with the engagement recession 25b of the sliding control recession 25 and an arresting part 35c capable of engaging with the locked part 22c of the sliding member 21. Thus, the sliding control part 35 engages with the sliding member 21 and directly enables and disables the sliding of the sliding member 21, allowing for more reliable control of the sliding member 21. In addition, there is no need to form a locking spring member 75 on the upper plate 72 of the shell 71, allowing for a simpler structure and reduced costs.

In addition, the sliding control recession 25 comprises the main recession 25a extending in the forward/backward direction of the housing 11, the engagement recession 25b extends from the front end of the main recession 25a towards the center of the widthwise direction of the housing 11, the sliding control part 35 comprises the forward-extending arm 35a, the engagement ridge 35b projects from the front end of the arm 35a, the arresting part 35c is the front end surface of the engagement ridge 35b, and the locked part 22c is the rear end surface of the sliding member 21. It is thereby possible to enable and disable the sliding of the sliding member 21 with greater reliability.

The effects of this embodiment are otherwise similar to those of the first embodiment; description thereof will therefore be omitted.

While a preferred embodiment of the Present Disclosure is shown and described, it is envisioned that those skilled in the art may devise various modifications without departing from the spirit and scope of the foregoing Description and the appended Claims.

What is claimed is:
1. A card connector, comprising:
a housing for receiving a card provided with a terminal member, the housing including a cover member that includes an upper plate for at least partially covering the housing and the card inserted therein, the housing including a guide ridge extending along its rear end;
a connector terminal, attached to the housing, for contacting the terminal member of the card;
a sliding member for retaining a card inserted from the rear end of the housing towards a front end and sliding in the forward/backward direction of the housing;
a first biasing member for biasing the sliding member towards the rear end;
a locking member, provided on the rear end of the housing, for sliding in the widthwise direction of the housing and locking the card received in the housing; and
a second biasing member for biasing the locking member towards the center of the widthwise direction of the housing;
wherein the locking member comprising a sliding control part for controlling the sliding of the sliding member;
the sliding control part preventing the sliding member from sliding when the locking member is in a first position for blocking the sliding of the card in the forward/backward direction of the housing, and allowing the sliding member to slide when the locking member is in a second position for allowing the card to slide in the forward/backward direction of the housing.

2. The card connector of claim 1, wherein the locking member further comprises a card engagement part, the card engagement part engaging with a cutout part formed in one end of the rear end of the card received in the housing when the locking member is in the first position.

3. The card connector of claim 1, wherein the cover member comprises a guide tab formed at a position facing the guide ridge of the upper plate.

4. The card connector of claim 3, wherein the locking member comprising a groove-shaped guide recession extending in the widthwise direction of the housing, the guide recession slidably engaging with the guide ridge and the guide tab.

5. The card connector of claim 4, wherein the upper plate further comprises an intermediate sliding control member for allowing the sliding member to slide or preventing the sliding member from sliding according to the position of the sliding control part.

6. The card connector of claim 5, wherein the intermediate sliding control member comprises a lock release abutting part abutting the sliding control part and a sliding lock part capable of engaging with a locked part of the sliding member.

7. The card connector of claim 6, wherein the sliding control part further comprises a sloped part extending diagonally upwards toward the center of the widthwise direction of the housing.

8. The card connector of claim 7, wherein, when the locking member slides from the first position to the second position, the lock release abutting part moves upward along the sloped part, and the engagement of the sliding lock part with the locked part is released.

9. The card connector of claim 8, wherein the sliding member further comprises a sliding control recession capable of engaging with the sliding control part.

10. The card connector of claim 9, wherein the sliding control part comprises an engagement ridge capable of engaging with an engagement recession constituted by the sliding control recession and a sliding lock part capable of engaging with the locked part of the sliding member.

11. The card connector of claim 10, wherein the sliding control recession comprises a main recession extending in the forward/backward direction of the housing, the engagement recession extending from a front end of the main recession towards the center of the widthwise direction of the housing.

12. The card connector of claim 11, wherein the sliding control part comprises an arm extending forward, the engagement ridge projecting from a front end of the arm.

13. The card connector of claim 12, wherein the locked part is a rear end surface of the sliding member.

14. A card connector, comprising:
- a housing configured to receive a card having at least one terminal member, the housing including a cover member which cooperates with the housing to define an internal card-receiving space, the housing further including an entrance that communicating with the internal card-receiving space;
- a connector terminal supported by the housing and configured, in operation, to contact the terminal member of the card;
- a slider configured to retaining a card inserted into the card-receiving space and configured for sliding longitudinally in the card-receiving space;
- a first biasing member for biasing the slider toward the entrance of the card-receiving space;
- a locking member disposed proximate to the entrance of the card-receiving space and configured for sliding widthwise of the housing for locking the card received in the card-receiving space, the locking member further including a sliding control part for controlling the longitudinal sliding of the slider, the sliding control part configured to prevent the slider from sliding when the locking member is in a first position, the first position configured to block the sliding of the card longitudinally in the card-receiving space, the locking member allowing the slider to slide when the locking member is in a second position, the second position configured to allow the card to slide longitudinally in the card-receiving space;
- a second biasing member for biasing the locking member toward a center of the housing; and,
- wherein the housing further includes a guide assembly for guiding the locking member in its widthwise movement, the guide assembly including a guide ridge and guide tab respectively disposed on opposing portions of the housing and cover member, and projection toward each other within a guide slot disposed in the locking member.

15. The card connector of claim 14, wherein the guide ridge and guide tab project less than one-half a height of the housing.

* * * * *